United States Patent
Abe et al.

(10) Patent No.: US 7,903,355 B2
(45) Date of Patent: **\*Mar. 8, 2011**

(54) LENS TUBE, METHOD OF ASSEMBLING LENS TUBE, AND CAMERA MODULE

(75) Inventors: Ryo Abe, Tenri (JP); Shozo Minamide, Iga (JP); Kohji Minami, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

This patent is subject to a terminal disclaimer.

(21) Appl. No.: 12/226,461

(22) PCT Filed: Mar. 20, 2007

(86) PCT No.: PCT/JP2007/055659
§ 371 (c)(1),
(2), (4) Date: Jan. 6, 2009

(87) PCT Pub. No.: WO2007/122945
PCT Pub. Date: Nov. 1, 2007

(65) Prior Publication Data
US 2009/0303620 A1    Dec. 10, 2009

(30) Foreign Application Priority Data

Apr. 17, 2006 (JP) ................................. 2006-113373
Oct. 19, 2006 (JP) ................................. 2006-285074

(51) Int. Cl.
*G02B 7/02* (2006.01)
(52) U.S. Cl. .......................... 359/819; 359/811; 348/373

(58) Field of Classification Search .......... 359/819–830, 359/811; 348/207.99, 373–376
See application file for complete search history.

(56) References Cited

U.S. PATENT DOCUMENTS 3,689,134 A * 9/1972 Leitmeir et al. ............... 359/830
5,896,234 A    4/1999 Miyamoto et al.
(Continued)

FOREIGN PATENT DOCUMENTS

JP                48037616          11/1973
(Continued)

OTHER PUBLICATIONS

Extended European Search Report as issued in EP 07739102.7 (Jul. 22, 2010).

*Primary Examiner* — Darryl J Collins
(74) *Attorney, Agent, or Firm* — David G. Conlin; Steven M. Jensen; Edwards Angell Palmer & Dodge LLP

(57) ABSTRACT

A lens tube has two, first and second lenses (1, 2), a tubular lens frame (3) for holding the two lenses (1, 2), and three spacers (7) in contact with the opposite lens surfaces of the first and second lenses (1, 2). The spacers (7) are arranged so as to be in contact with curved surfaces of the first and second lenses (1, 2) and determine the distance between the first and second lenses (1, 2). The lens frame (3) has the same inner diameter between the first and second lenses (1, 2), and the spacers (7) are in contact with the inner wall of the lens frame (3). Since the lens frame (3) has the same inner diameter between the first and second lenses (1, 2), the first and second lenses (1, 2) are held with their centers perfectly aligned with each other.

16 Claims, 29 Drawing Sheets

U.S. PATENT DOCUMENTS

| | | | |
|---|---|---|---|
| 7,525,743 B2 * | 4/2009 | Minami | 359/811 |
| 2003/0103279 A1 | 6/2003 | Anhalt | |
| 2008/0068733 A1 * | 3/2008 | Chen | 359/811 |

FOREIGN PATENT DOCUMENTS

| | | |
|---|---|---|
| JP | 9318858 | 12/1997 |
| JP | 2004-233795 | 8/2004 |
| JP | 2004222064 | 8/2004 |
| JP | 2004-354519 | 12/2004 |
| JP | 2005257974 | 9/2005 |
| JP | 2005-274612 | 10/2005 |
| JP | 2006-243573 | 9/2006 |

\* cited by examiner (a)

(b)

(a)

(b)

(a)

(b)

LENS TUBE, METHOD OF ASSEMBLING LENS TUBE, AND CAMERA MODULE

TECHNICAL FIELD

The present invention relates to a lens tube, a method of assembling the lens tube, and a camera module, and more specifically relates to a lens tube holding a plurality of lenses fixed onto a lens frame, a method of assembling a lens tube, and a camera module using the lens tube.

BACKGROUND ART

A conventional lens tube incorporates one lens group or a plurality of lens groups as a photographing optical system. The lens tube is generally assembled from a plurality of lenses, which constitute such a lens group, and a lens frame which incorporates and holds the lenses. A method of assembling the lens tube shown in FIG. 13 is known as a method for incorporating a plurality of lenses, which belong to the lens group of the lens tube, into the lens frame at a predetermined distance. In this method of assembling the lens tube, a lens tube 105 is formed by incorporating lenses 101, 102 into a lens frame 103 from one direction and interposing a space ring 104 which is processed in advance to have a predetermined thickness so that a predetermined distance may be secured between the lenses 101 and 102.

However, in the method of assembling the lens tube shown in FIG. 13, clearance is needed between the inner wall of the lens frame 103 and the space ring 104, and therefore when the space ring 104 is decentered, the point of contact between the space ring 104 and the lens 101 (or the lens 102) is displaced and the lens 101 (or the lens 102) may be inclined as a result.

Accordingly, a lens tube with the configuration as shown in FIG. 14A and FIG. 14B has been proposed for the purpose of preventing such inclination of the lenses (see JP H9-318858 A). It is to be noted that FIG. 14A(a) is a transverse cross-sectional view seen from XIVAa-XIVAa line of FIG. 14A(b), FIG. 14A(b) is a vertical cross-sectional view seen from XIVAb-XIVAb line of FIG. 14A(a), FIG. 14B(a) is a transverse cross-sectional view seen from XIVBb-XIVBb line of FIG. 14B(b), and FIG. 14B(b) is a vertical cross-sectional view seen from XIVBa-XIVBa line of FIG. 14B(a).

As shown in FIG. 14A (FIG. 14B), the lens tube uses at least three steel balls 206 (306) as component members equivalent to conventional space rings for securing a predetermined distance between lenses 201, 202 (301, 302) within a lens frame 203 (303), and these steel balls 206 (306) are placed at equidistant positions obtained when the lens 201, 202 (301, 302) are generally trichotomized in the circumferential direction. Accordingly, assembling is conducted with a distance between the lenses 201, 202 (301, 302) set at a predetermined value based on the diameter size of the steel ball 206 (306).

Since the variation in the outline dimension of commercially available steel balls is several micrometers or some tenths of one micrometer, it becomes possible to set the precision error with respect to the distance between lenses at several micrometers or less than some tenths of one micrometer.

The assembly process in the lens tube assembling method employs the steps for first inserting the lens 201 (301) into the lens frame 203 (303), then placing the steel balls 6 within the lens frame 203 (303), and finally inserting the lens 202 (302) into the lens frame 203 (303).

The lens frame 203 (303) of the lens tube has a positioning structure 207 (207) having a recess section, which regulates the steel balls 206 (306) in the circumferential direction and in the diameter direction so as to position the steel balls 106 at equal intervals.

However, in the case where the positioning structure 207 (307) is provided in the lens frame 203 (303) as seen in FIG. 14A and FIG. 14B, manufacturing costs of the tube increase with complication of the lens frame configuration.

In the configuration as seen in FIG. 14B, it is necessary to provide the positioning structure 307 inside the steel ball 306, which reduces the effective area of the lens.

In order to secure a wider effective area of the lens, the inside diameter of the positioning structure needs to be expanded, and this requires the inside diameter of the lens frame to be expanded, which in turn causes increase in tube size.

For example, in the case where the lens tube is used as a component member of a camera module for cellular phones which are required to be downsized, it is preferable to decrease the size of the tube as a component member of the module since upsizing of the tube leads to upsizing of the entire module.

When the positioning structure is not formed in the lens tube, it becomes possible to secure a larger effective area and to constitute a lens system with a combination having higher flexibility. However, when steel balls are placed at predetermined positions in the circumferential direction, the motion of the steel balls is not regulated, and therefore the steel balls may move from the predetermined positions during the assembling process, which may generate clearance between the steel balls and the lens frame inner wall and eventually cause inclination of the lenses as in the case of using the space rings.

In the case where the surface on which the steel balls 406 are placed is flat as shown in FIG. 15 in particular, the motion of the steel balls 406 is not regulated in the circumferential direction nor in the diameter direction, and therefore it is extremely difficult to place the steel balls 406 at generally trichotomized equidistant positions so as to be in contact with the inner wall of the lens frame 403 and then to conduct assembling while keeping the steel balls 406 unmoved.

Moreover, in the case where the surface on which the steel balls 406 are placed is concaved, the motion of the steel balls 406 is not regulated in the circumferential direction nor in the diameter direction, and therefore it also becomes difficult to proceed the assembling process afterward as in the case of the flat surface.

SUMMARY OF THE INVENTION

Therefore, the present invention aims at providing a lens tube capable of keeping a distance between lenses with high precision while reliably preventing inclination of the lenses in a lens frame, a method of assembling the lens tube, and a camera module using the lens tube.

A lens tube according to the present invention comprises:
two lenses;
a tubular lens frame for holding the two lenses; and
three or more spacers which are placed between the two lenses and which are in contact with opposite lens surfaces of the two lenses, wherein
portions of the lens frame which respectively hold the two lenses have an identical inner diameter, and wherein
the spacers are in contact with an inner wall of the lens frame.

According to the configuration, the portions of the lens frame for holding each of the two lenses have an identical inner diameter, so that it becomes possible to hold the two lenses with their centers perfectly aligned with each other. Since the spacers are brought into contact with the inner wall of the lens frame, the spacers are to be positioned with high precision on the same circumference around the optical axes of the two lenses. Consequently, inclination of the lenses due to displaced points of contact between the two lenses and the spacers does not occur, so that the optical axes of the lenses can be aligned with high precision. While each of the two lenses may be one optical device or may be a compound lens formed by joining a plurality of optical devices, one compound lens is treated as one lens in the invention.

In one embodiment, the spacers are placed outside an area of an effective beam which passes a lens system composed of the two lenses.

According to the embodiment, the spacers are placed outside the area of the effective beam which passes the lens system, so that it becomes possible to suppress inclination of the lenses in the lens tube without affecting the optical property of the tube.

In one embodiment, the spacers are fixed to at least one of the two lenses with adhesive, and the adhesive is applied to an outside of an area of an effective beam which passes a lens system composed of the two lenses.

According to the embodiment, the spacers are fixed to at least one of the two lenses, so that the spacers may be fixed more firmly and their shock resistance is enhanced. The adhesive is applied to the outside of the area of the effective beam which passes the lens system, so that it becomes possible to prevent the optical performance from being degraded.

In one embodiment, the adhesive comprises a light-shielding resin.

According to the embodiment, a light-shielding resin is used as the adhesives, so that impact resistance can be enhanced by fixation of the spacers, and stray light by reflection from the spacer surface may be prevented.

A lens tube according to the present invention comprises:
two lenses;
a tubular lens frame for holding the two lenses; and
three or more spacers which are placed between the two lenses and which are in contact with opposite lens surfaces of the two lenses, wherein
constituent materials of the spacers include ferromagnetic materials or ferrimagnetic materials.

According to the configuration, the spacers may be placed at arbitrary positions by magnetizing and attracting the spacers, which includes ferromagnetic materials or ferrimagnetic materials, from the outside of the lens frame with use of a magnetism generator and the like.

In one embodiment, a constituent material of the lens frame is a paramagnetic material or a diamagnetic material.

According to the embodiment, paramagnetic materials or diamagnetic materials are used as a material of the lens frame, so that it becomes possible to place the spacers at arbitrary positions without receiving the influence of magnetization of the lens frame itself.

In one embodiment, the spacers are placed outside an area of an effective beam which passes a lens system composed of the two lenses.

According to the embodiment, the spacers are placed outside the area of the effective beam which passes the lens system, so that it becomes possible to prevent inclination of the lenses in the lens tube without affecting the optical property of the tube.

In one embodiment, the spacers are fixed to at least one of the two lenses with adhesive, and the adhesive is applied to an outside of an area of an effective beam which passes a lens system composed of the two lenses.

According to the embodiment, the spacers are fixed to at least one of the two lenses, so that the spacers may be fixed more firmly and their shock resistance is enhanced. The adhesive is applied to the outside of the area of the effective beam which passes the lens system, so that it becomes possible to prevent the optical performance from being degraded.

In one embodiment, the adhesive is a light-shielding resin.

According to the embodiment, a light-shielding resin is used as the adhesive so that impact resistance can be enhanced by fixation of the spacers, and stray light by reflection from the spacer surface may be prevented.

The present invention also provides a method of assembling a lens tube, the lens tube comprising two lenses; a tubular lens frame for holding the two lenses; and spacers which are placed between the two lenses and which are in contact with opposite lens surfaces of the two lenses, wherein constituent materials of the spacers include ferromagnetic materials or ferrimagnetic materials, and a constituent material of the lens frame is a paramagnetic material or a diamagnetic material, the method of assembling the lens tube comprising:

a first step for inserting a first lens, that is one of the two lenses, into the tubular lens frame;

a second step for placing the three or more spacers on the first lens inserted into the lens frame;

a third step for placing a magnetism generator outside the lens frame and using attraction between a magnetic pole of the magnetism generator and each spacer placed in the lens frame to thereby position the spacers; and a fourth step for inserting a second lens, that is the other lens of the two lenses, into the lens frame in a state that the spacers are positioned by the magnetism generator, and fixing the second lens to the lens frame.

According to the configuration, in the lens tube including three or more spacers in between the surfaces of at least two lenses out of a plurality of the lenses, a magnetism generator is placed outside the lens frame, so that the motion of the spacers including a ferromagnetic material or a ferrimagnetic material is regulated in the circumferential direction and in the diameter direction. More specifically, spacers including the magnetic material are used as the spacers for holding the first and second lenses at a predetermined distance within the lens frame, and the spacers including the magnetic materials are attracted to the predetermined positions with the magnetic force of the magnetism generator placed outside the lens frame so as to regulate the motion of the spacers, by which the spacers may easily be placed in between the lenses while being kept unmoved during assembling process. Therefore, it becomes possible to keep a distance between lenses with high precision while reliably preventing inclination of the lenses within the lens frame.

In one embodiment, a lens surface on which the spacers are placed is an inclined plane which is gradually lowered toward an inside of the lens frame, and wherein
wall thickness t of the lens frame is expressed as $$t < \sqrt{\frac{M_1 M_2}{4\pi \mu mg \times \cos\theta}}$$

wherein $\theta$ represents an angle of inclination of the lens surface which is in contact with the spacer, $M_1$ represents magnetic pole strength of the spacer, m represents mass of the spacer, $M_2$ represents magnetic pole strength of the magnetism generator, $\mu$ represents magnetic permeability of the lens frame, and g represents acceleration of gravity.

According to the embodiment, the wall thickness of the lens frame is determined so as to satisfy the condition, so that it becomes possible to bring the spacers into contact with the inner wall of the lens frame even when the first lens surface on which the spacers are placed is an inclined plane inclined toward the inside of the lens frame.

In one embodiment, number of the magnetic poles of the magnetism generators is identical to number of the spacers placed on the first lens, and in the third step, magnetic poles of the magnetism generators are placed outside the lens frame at equal intervals in a circumferential direction of the lens frame.

According to the embodiment, the magnetism generators having magnetic poles of the same number as the spacers placed on the first lens are placed outside the lens frame at equal intervals in the circumferential direction, so that the spacers may be placed within the lens frame at equal intervals in the circumferential direction.

In one embodiment, a spacer guide for placing the spacers at prescribed positions is used.

According to the embodiment, in the method of assembling the lens tube of the embodiment, using a spacer guide makes it possible to easily place the spacers at predetermined positions.

In one embodiment, in the second step, the spacers are placed outside an area of an effective beam which passes the first and second lenses.

According to the embodiment, the spacers are placed outside the area of the effective beam which passes the lens system, so that it becomes possible to conduct high-precision assembling without affecting the optical property of the lens tube.

In one embodiment, the method comprises a fifth step for fixing the spacers to at least one of the first and second lenses with adhesive, and an application area of the adhesive is outside an area of an effective beam which passes the first and second lenses.

According to the embodiment, the spacers are fixed to at least one of the first and second lenses with adhesive, so that it becomes possible to fix the spacers more firmly to predetermined positions and to enhance their shock resistance as compared with the case where the spacers are only held in between the lens surfaces. An application area of the adhesive is made outside the area of the effective beam which passes the lens system, so that the spacers may be fixed without affecting the optical performance of the lens tube.

In one embodiment, the adhesive for fixing the spacers to at least one of the first and second lenses comprises a light-shielding resin.

According to the embodiment, using light-shielding resin for fixing the spacers makes it possible to achieve both the fixation of the spacers and the prevention of stray light caused by reflection from the spacer surface.

In one embodiment, the light-shielding resin is applied to contact sections between the first lens and each of the spacers and to contact sections between the second lens and each of the spacers.

According to the embodiment, the light-shielding resin is applied to the contact section between the first lens and each spacer and to the contact section between the second lens and each spacer, so that the spacers are reliably fixed and the light blocking effect is enhanced.

Furthermore, a camera module according to the present invention comprises the aforementioned lens tube and a light receiving section having an image sensor for picking up images formed with use of the lens tube.

According to the configuration, an effective area can be secured and downsizing of the tube diameter can be achieved as compared with the tube using conventional spacers, which brings about an effect of enabling the entire lens system in the module to be downsized.

EFFECT OF THE INVENTION

As is apparent from the above, according to the lens tube and the method of assembling the lens tube of the invention, the lens tube and the method of assembling the lens tube may be implemented which can easily place the spacers present in between the lens surfaces at predetermined positions and which can reliably prevent inclination of the lenses in the lens frame.

Since the structure for positioning the spacers are not necessary, the tube can be downsized, and thereby the entire lens system can be downsized.

According to the camera module of the invention, the entire lens system of the module can be downsized by using the lens tube.

BRIEF DESCRIPTION OF THE DRAWINGS

FIG. 6A is a top view for explaining a method for placing the spacers using a spacer guide and is also a transverse cross-sectional view seen from VIa-VIa line of FIG. 6B, while FIG. 6B is a vertical cross-sectional view seen from VIb-VIb line of FIG. 6A;

FIG. 18A is a top view for explaining a method for placing spheres using a spacer guide and also is a transverse cross-sectional view seen from XVIIIa-XVIIIa line of FIG. 18B, while FIG. 18B is a vertical cross-sectional view seen from XVIIIb-XVIIIb line of FIG. 18A;

FIG. 25A is a top view of a lens tube in the case of using cylindrical spacers and is also a transverse cross-sectional view seen from XXVa-XXVa line of FIG. 25B, while FIG. 25B is a vertical cross-sectional view seen from XXVb-XXVb line of FIG. 25A.

DETAILED DESCRIPTION OF THE INVENTION

A lens tube, a method of assembling the lens tube, and a camera module of the invention will be described in detail in conjunction with the embodiments with reference to the drawings.

First Embodiment

Figure 1:
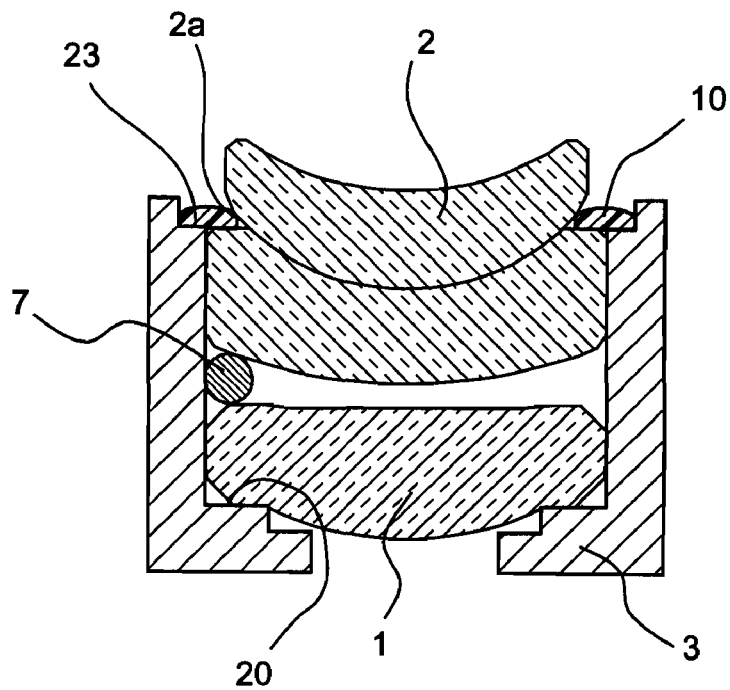
FIG. 1 is a cross sectional view of a lens tube in a first embodiment of the invention.

FIG. 1 shows a cross section of a lens tube in the first embodiment of the invention.

The lens tube shown in FIG. 1 is composed of two lenses, first lens and second lens, a tubular lens frame 3 for holding each of the first and second lenses 1, 2, and three spherical spacers 7 which are in contact with the opposite lens surfaces of the first and second lenses 1, 2. In this case, the spacers 7 are present in the state of being in contact with the curved surfaces of the first lens 1 and the second lens 2 and determine a distance between the first and second lenses 1, 2. The first lens 1 is a compound lens made up of two optical devices.

A step section 20 provided in the vicinity of a lower end side of the inner circumference of the lens frame 3 is in contact with a peripheral section of the lens surface of the first lens 1. The spacers 7 are fixed to the first lens 1 with adhesives 10.

The second lens 2, which is a compound lens, is formed by joining two meniscus lenses and has an annular groove 2a formed on the outer circumference side of its joint surface. A step section 23 is formed in the lens frame 3 so as to face the annular groove 2a. The second lens 2 inserted in the lens frame 3 is fixed to the lens frame 3 with the adhesives 10 with use of the step section 23. Accordingly, a motion of the second lens 2 in the optical axis direction is regulated so that the second lens 2 is reliably fixed to the lens frame 3.

The inside diameter of the lens frame 3 is the same between the first and second lens 1, 2, and the spacers 7 are in contact with the inner wall of the lens frame 3. Since the inside diameter of the lens frame 3 is the same between the first and second lens 1, 2, the first and second lenses 1, 2 may be held with their centers perfectly aligned with each other.

Since the spacers 7 are brought into contact with the inner wall of the lens frame 3, the spacers 7 are to be positioned with high precision on the same circumference around the optical axes of the first and second lenses 1, 2. Consequently, inclination of the lenses due to displaced point of contacts between the first and second lenses 1, 2 and the spacers does not occur, which makes it possible to align the optical axes of the lenses with high precision.

The spacers 7 are in contact with the inner wall of the lens frame 3 and are placed outside the area of an effective beam which passes a lens system composed of the first and second lenses 1, 2. Thus, the spacers 7 are placed outside the area of the effective beam which passes the lens system, so that it becomes possible to suppress inclination of the lens tube without being influenced by eclipse of an effective beam by the spacers 7 and the like. The word "eclipse" herein refers to a phenomenon in which effective luminous flux which passes the optical system is blocked by lenses, tubes and the like present on its pathway.

Moreover, the spacers 7 are fixed to the first lens 1 with the adhesives 10, so that it becomes possible to fix the spacers 7 more firmly to predetermined positions and to enhance their shock resistance as compared with the case where the spacers are only held in between the lens surfaces of the first lens 1 and the opposite second lens 2.

Although the spacers 7 are fixed to the first lens 1 in FIG. 1, the same effect may be achieved when the spacers 7 are not limitedly fixed to the first lens 1 but to at least either one of the two lenses 1, 2.

The application position of the adhesives 10 for fixing the spacers 7 are outside the area of the effective beam which passes the lens system composed of the first and second lenses 1, 2, so that eclipse of the effective beam and the like caused by adhesives does not affect the optical property of the lens tube.

When metal having a glossy surface or the like is used as a material of the spacer 7, the reflected light on the surface of the spacer 7 may turn into stray light, which may affect the optical property of the lens tube.

Such stray light may be prevented, for example, by the method in which the outer circumference of the spacer 7 is subjected to surface treatment such as blackening and delustering by plating and other techniques in order to prevent reflection of light from the surface. However, the method brings about problems such as increase in cost and cycle time due to the surface treatment and generation of varied outline dimensions after application of the surface treatment.

Figure 2:
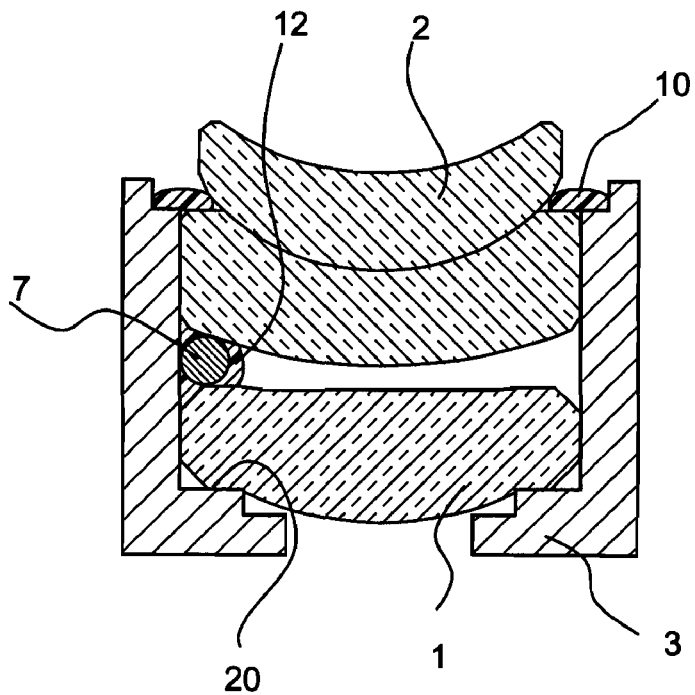
FIG. 2 is a cross sectional view of the lens tube when light-shielding resin is used for fixation of spacers.

Accordingly, as shown in FIG. 2, using light-shielding resin 12 as adhesives for fixing the spacer 7 and the first and second lenses 1, 2 makes it possible to prevent stray light without applying the surface treatment to the spacer 7, so that it becomes possible to achieve improvement in cost and cycle time of the surface treatment.

Examples of the light-shielding resin 12 may include light-resistant black resin constituted of thermosetting resin such as epoxy resin doped with black pigments.

Second Embodiment

Figure 3:
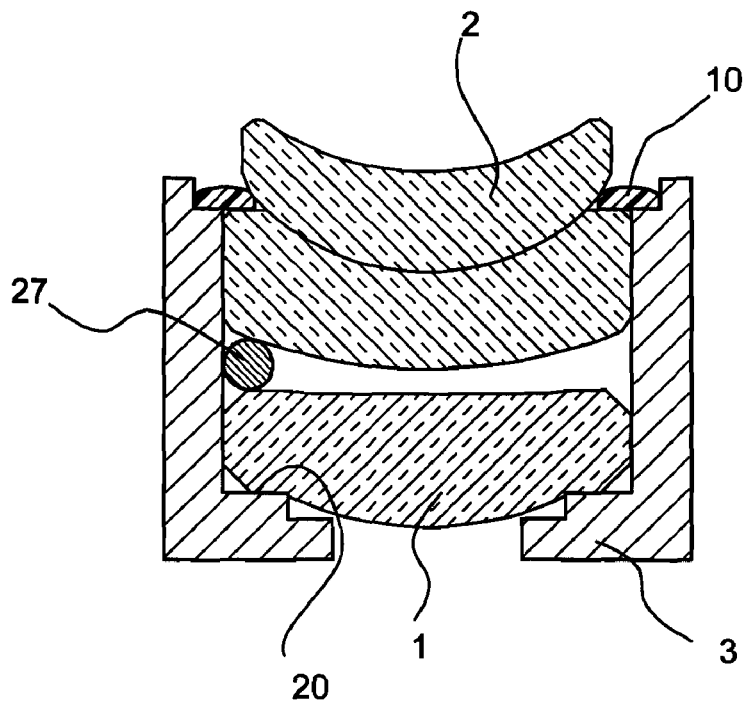
FIG. 3 is a cross sectional view of a lens tube in a second embodiment of the invention.

FIG. 3 shows a cross section of a lens tube in the second embodiment of the invention. The lens tube of the second embodiment is similar in configuration to the lens tube of the first embodiment except for the spacers, and therefore similar component members are designated by similar reference numerals.

A lens tube shown in FIG. 3 is composed of two lenses, first and second lenses 1, 2, a cylindrical lens frame 3 for holding the first and second lenses 1, 2 with their optical axes aligned with each other, and three spherical spacers 27 which are in contact with the opposite lens surfaces of the first and second lenses 1, 2 and with the inner wall of the lens frame 3. In this case, the spacers 27, which include ferromagnetic materials or ferrimagnetic materials, are present in the state of being in contact with the curved surfaces of the first lens 1 and the second lens 2 and determine a distance between the first and second lenses 1, 2.

As the ferromagnetic materials and the ferrimagnetic materials included in the spacers 27, any one of the materials shown in (1) to (3) below may be used:

(1) alloys containing at least any one of elements selected from a group made up of Fe, Co, Ni or Fe, Co, Ni, Mn, and Cr;

(2) soft magnetic materials such as NiFe-based alloys called "permalloys", CoNbZr-based alloys, FeTaC-based alloys, CoTaZr-based alloys, FeAlSi-based alloys, FeB-based alloys, and CoFeB-based alloys; and (3) half metal magnetic materials such as Heusler alloys, $CrO_2$, $Fe_3O_4$, and $La_{1-x}Sr_xMnO_3$.

The materials of the spacers 27 may appropriately be selected from the above. Paramagnetic materials or diamagnetic materials may be used as a material of the lens frame 3.

The lens frame 3 has a step section 20 provided in the vicinity of a lower end side of the inner circumference thereof, and the step section 20 is in contact with a peripheral section of the lens surface of the first lens 1.

Figure 4A:
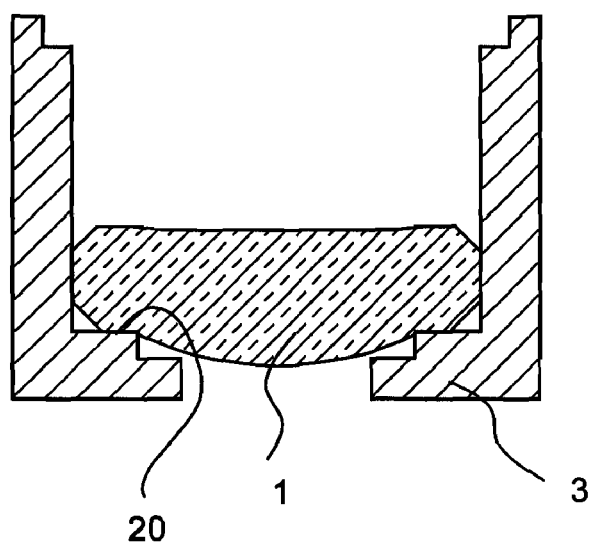
FIG. 4A is a view for explaining the procedures in the method of assembling the lens tube.
Figure 4B:
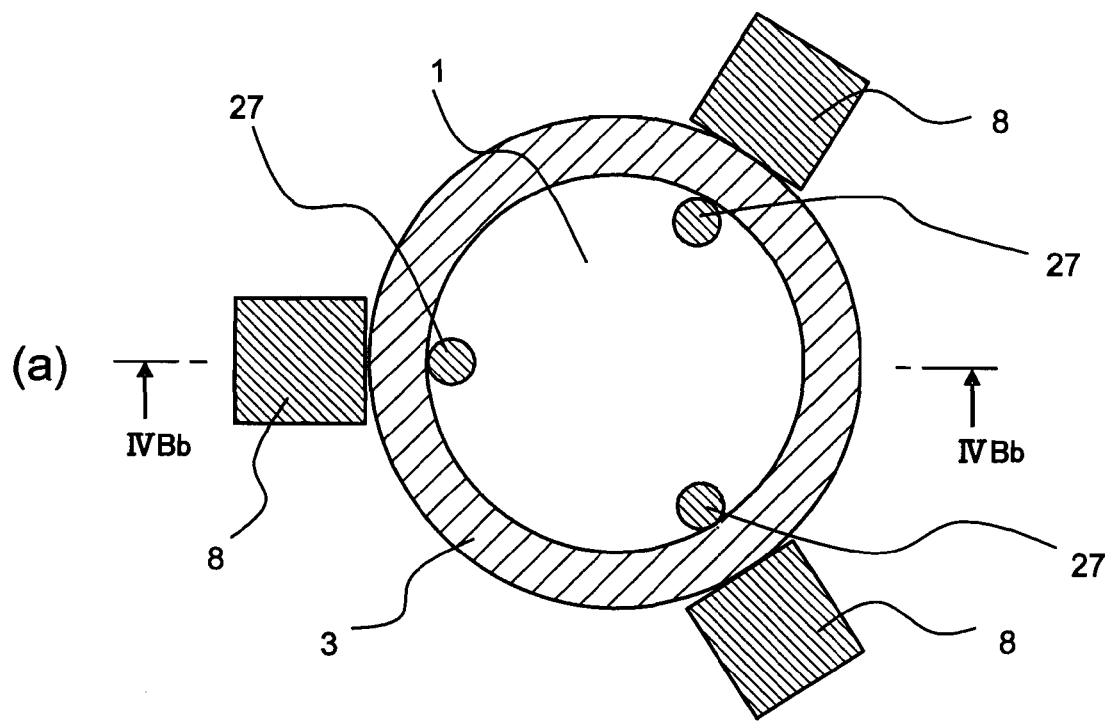
FIG. 4B is a view showing the procedures in the method of assembling the lens tube subsequent to the procedures in FIG. 4A, in which FIG. 4B(a) is a transverse cross-sectional view seen from IVBa-IVBa line of FIG. 4B(b), and FIG. 4B(b) is a vertical cross-sectional view seen from IVBb-IVBb line of FIG. 4B(a)
Figure 4B:
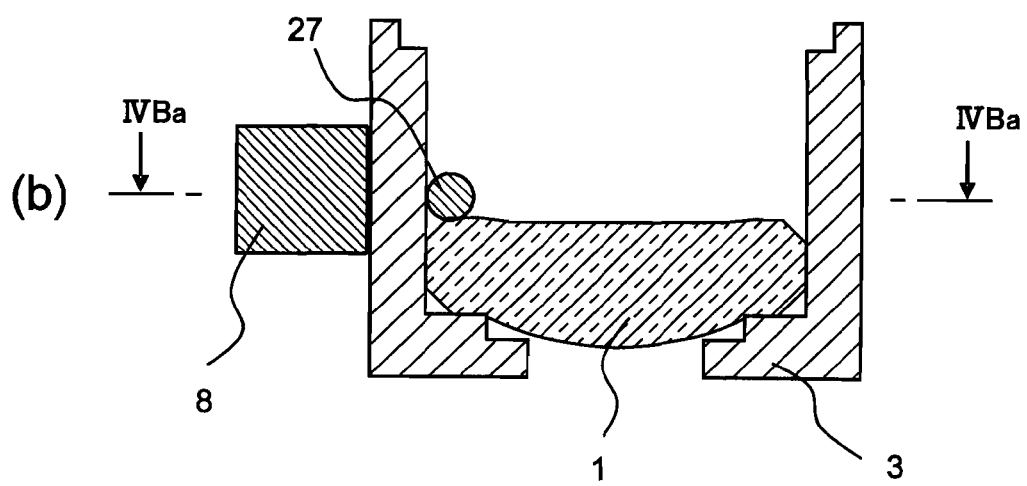
Figure 4C:
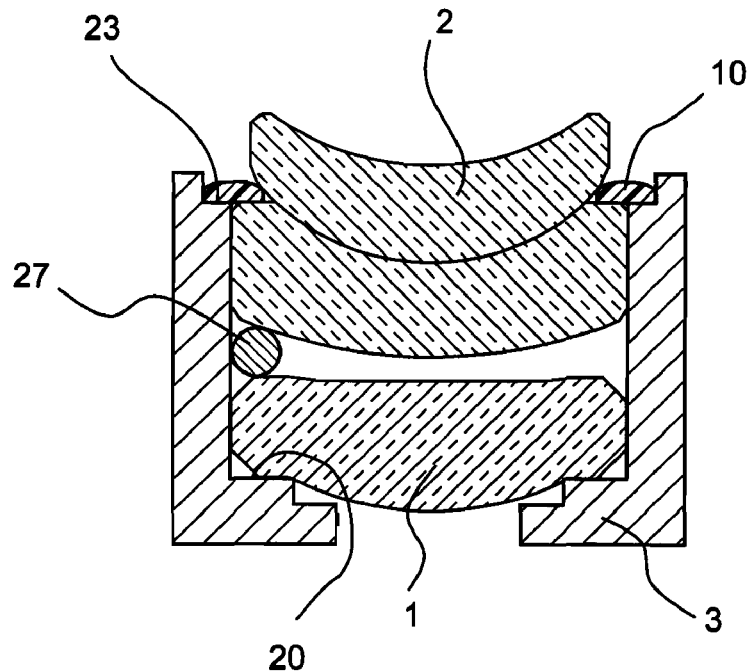
FIG. 4C is a view showing the procedures in the method of assembling the lens tube subsequent to the procedures in FIG. 4B.

Description is now given of the procedures in the method of assembling the lens tube shown in the second embodiment. FIG. 4A to FIG. 4C are views for explaining the procedures in the method of assembling the lens tube shown in the second embodiment. FIG. 4B(a) is a cross sectional view seen from IVBa-IVBa line of FIG. 4B(b), and FIG. 4B(b) is a cross sectional view seen from IVBb-IVBb line of FIG. 4B(a).

First, as shown in FIG. 4A, the first lens 1 is inserted into the lens frame 3. A step section 20 on the inner circumference of the lens frame 3 comes into contact with a peripheral section of one lens surface of the first lens 1.

If the inside diameter of the lens frame 3 is larger than the outer diameter of the first and second lenses 1, 2, a space is generated between the inner wall of the lens frame 3 and the first and second lenses 1, 2, and thereby the first lens 1 and the second lens 2 become out of alignment after the assembling process. Therefore, it is necessary to make the inside diameter of the lens frame 3 equal to or smaller than the outline of the first and second lenses 1, 2.

Next, as shown in FIG. 4B, the spacers 27 are placed in the lens frame 3. In this case, the spacers 27 are attracted to magnetism generators 8 placed on the outside of the lens frame 3, come into contact with the inner wall of the lens frame 3, and are positioned at equidistant positions obtained when the circumferential direction of the first and second lenses 1, 2 is divided into generally three sections. As the magnetism generator 8, electromagnets, permanent magnets and the like may be used.

In the case where paramagnetic materials or diamagnetic materials are used as a material of the lens frame 3, magnetization of the material of the lens frame 3 by the magnetism generator 8 is as small as negligible, so that the spacers 27 may be positioned at arbitrary positions without receiving the influence of magnetization of the lens frame 3 itself.

In the method of assembling the lens tube explained in FIG. 4B, the lens surface (the face facing the second lens 2) of the first lens 1 on which the spacers 27 are placed is generally flat.

In the case where the lens surface of the first lens 1 on which the spacers 27 are placed is flat or convex as shown in FIG. 4B, force is not applied in the direction of distancing the spacers 27 away from the inner wall of the lens frame 3.

Figure 5:
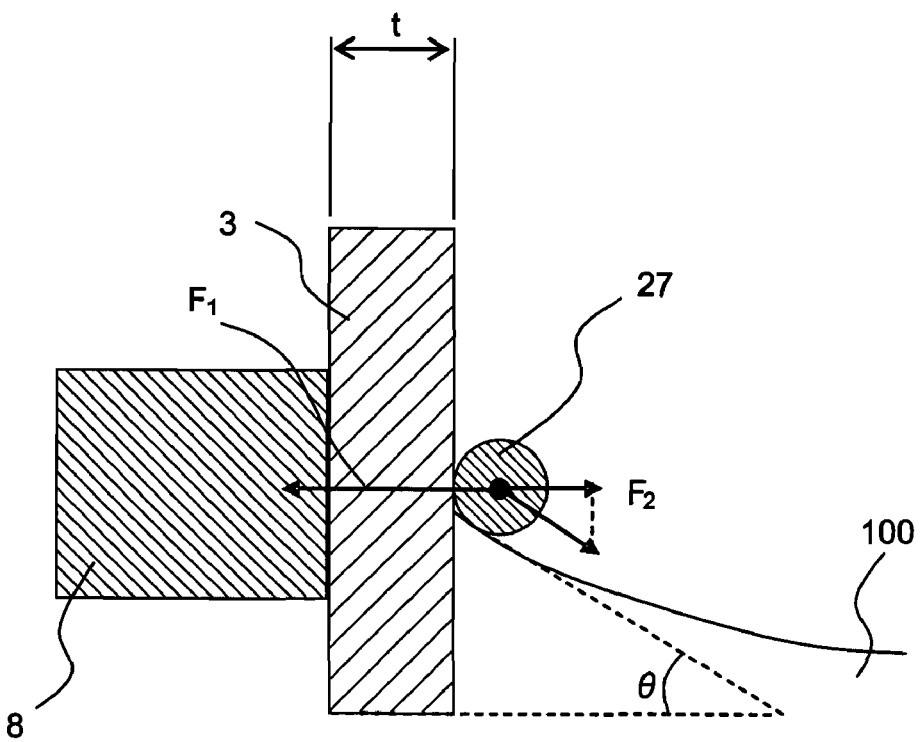
FIG. 5 is an explanatory view for explaining the conditions which allow assembling process when a first lens surface on which the spacers are placed forms an inclined plane inclined toward the inside of a lens frame.

However, in the case where the lens surface of a first lens 100 on which the spacers 27 are placed is concave, i.e., an inclined plane gradually lowered toward the inside of the lens frame 3 as shown in FIG. 5, the force shown below is applied to the spacers 27 in the direction of distancing the spacers 27 away from the inner wall upon placement of the spacers 27:

$$F_2 = (mg)\cos\theta$$

wherein, m represents mass of the spacer 27, g represents acceleration due to gravity, and θ represents an angle of inclination of the lens surface of the first lens 100 on which the spacers 27 are placed.

Therefore, when assembling is conducted with the configuration as shown in FIG. 5, it is necessary to select the lens frame 3, the spacer 27, and the magnetism generator 8 so that attraction $F_1$ of the magnetism generator 8 which attracts the spacer 27 to the inner wall of the lens frame 3 becomes $F_1 > F_2$.

When the spacer 27 having magnetic pole strength $M_1$ is attracted by the magnetism generator 8 having magnetic pole strength $M_2$, attraction $F_1$ is expresses as shown below:

$$F_1 = (1/4\pi\mu)(M_1 M_2 / t^2)$$

In the above equation, t represents wall thickness of the lens frame 3, and μ represents magnetic permeability of the material of the lens frame 3.

Therefore, if the quality and wall thickness of the material of the lens frame 3 is selected so as to satisfy $F_1 - F_2 > 0$, then it becomes possible to place the spacer 27 so as to be in contact with the lens frame 3 even when the force $F_2$ is applied in the direction of separating the spacer 27 away from the inner wall upon placement of the spacer 27.

As is clear from the foregoing description, if the wall thickness t of the lens frame 3 is determined so as to fulfill the condition shown below, then it becomes possible to attract the spacer 27 by the magnetism generator 8 even when the lens surface of the first lens 100 on which the spacers 27 are placed is an inclined plane gradually lowered toward the inside of the lens frame 3:

$$t < \sqrt{\frac{M_1 M_2}{4\pi\mu mg \times \cos\theta}}$$

In this case, when the spacers 27 are placed in the lens frame 3 with use of a holder such as tweezers, the spacers 27 may be drawn to unintended directions unless the respective spacers 27 are held in the vicinity of target positions because a plurality of the magnetism generators 8 are placed.

Figure 6:
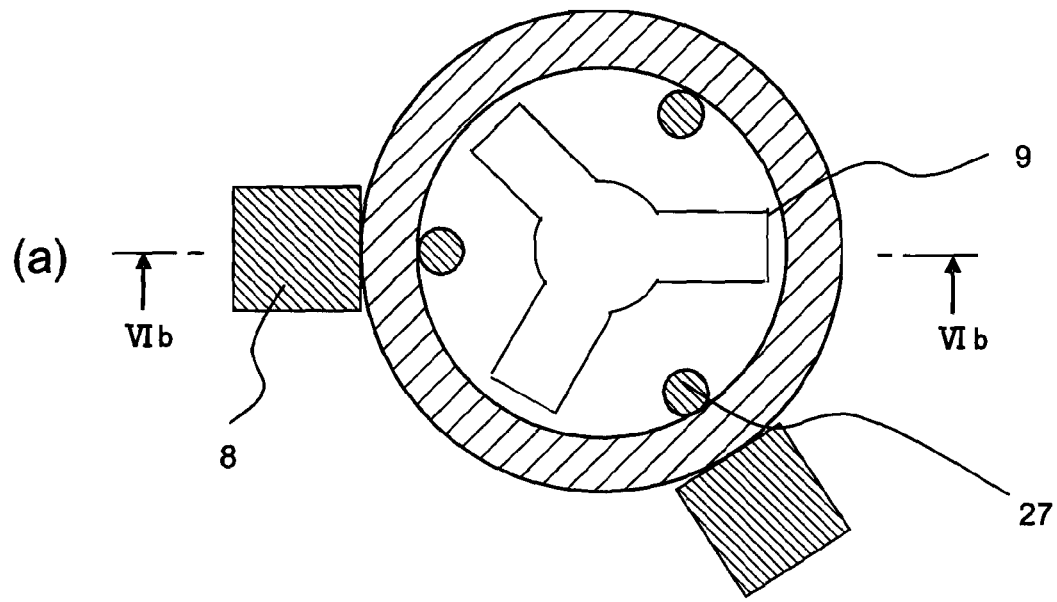
Figure 6:
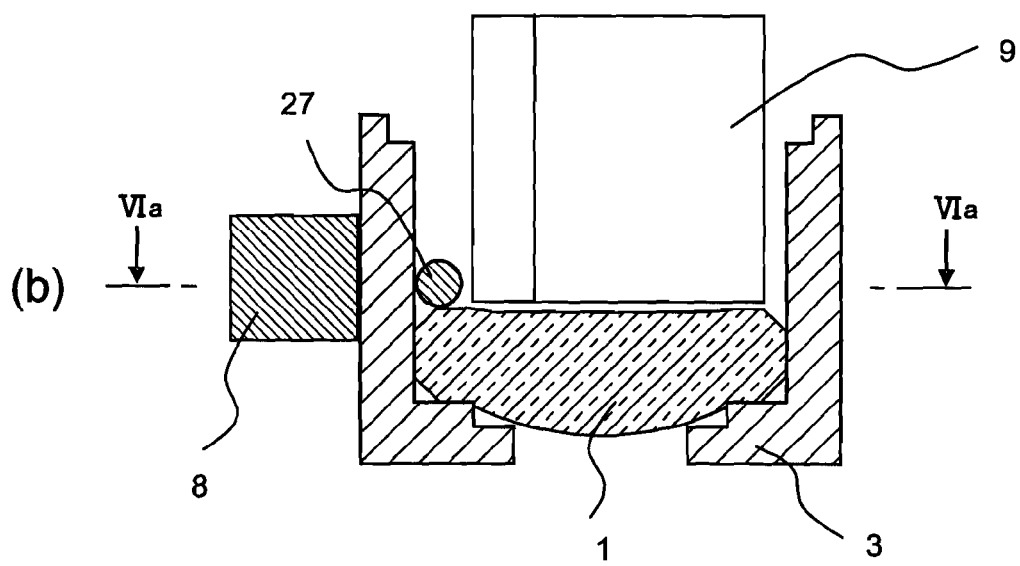

As a solution, a spacer guide 9 shown in FIG. 6A and FIG. 6B is used. FIG. 6B(a) is a cross sectional view seen from VIa-VIa line of FIG. 6B(b), and FIG. 6B(b) is a cross sectional view seen from VIb-VIb line of FIG. 6B(a). Use of the spacer guide 9 enables the respective spacers 27 to be inserted into the lens frame 3 through the spacer guide 9, so that it becomes possible to easily position the spacers 27 at positions attracted by each magnetism generator 8 without the necessity of holding the spacers 27 in the vicinity of the target positions.

The spacers 27 are dimensioned so that the spacers 27 are placed outside the area of the effective beam which passes a lens system composed of the first and second lenses 1, 2 and that a distance between the lens surfaces of the first and second lenses 1, 2 become a predetermined distance.

Next, as shown in FIG. 4C, after the second lens 2 is inserted into the lens frame 3, the second lens 2 and the lens frame 3 are fixed with the adhesives 10 with use of the step section 23 of the lens frame 3, by which a lens tube is completed.

In fixing lenses in the assembling process of the lens tube, ultraviolet curing resin is generally used as adhesives. In this case, after ultraviolet curing resin is applied to between the second lens 2 and the lens frame 3, the ultraviolet curing resin should be irradiated with ultraviolet rays for hardening.

Using the above-explained method of assembling the lens tube enables the magnetism generators 8 provided outside the lens frame 3 to regulate the motion of the spacers 27, so that it becomes possible to easily position the spacers 27 at predetermined positions.

Since the motion of the spacers 27 are regulated by the magnetism generators 8 with the spacers 27 being in contact with the inner wall of the lens frame 3, the spacers 27 will not be separated from the inner wall of the lens frame 3 in the subsequent assembling process, so that it becomes possible to prevent inclination of the lenses due to displacement of the points of contact between the first and second lenses 1, 2 and the spacers 27.

According to the lens tube and the assembly method thereof, the spacers 27 which are made of magnetic substances are attracted to predetermined positions with the magnetic force of the magnetism generators 8 placed outside the lens frame 3 so that the motion of the spacers 27 are regulated. Consequently, it becomes possible to easily place the spacers 27 in between the first and second lenses 1, 2 so that the spacers 27 do not move during the assembling process, and to keep the distance between the lenses with high precision while reliably preventing inclination of the first and second lenses 1, 2 in the lens frame 3.

Moreover, the magnetism generators 8 having magnetic poles of the same number as the spacers 27 placed on the first lens 1 are placed outside the lens frame 3 at equal intervals in the circumferential direction, so that the spacers 27 may be placed within the lens frame 3 at equal intervals in the circumferential direction.

In the method of assembling the lens tube, using the spacer guide 9 for placing the spacers 27 at prescribed positions makes it possible to easily position the spacers 27 at predetermined positions.

Moreover, the spacers 27 are placed outside the area of the effective beam which passes the lens system composed of the first and second lenses 1, 2, so that it becomes possible to conduct high-precision assembling without affecting the optical property of the lens tube.

Although the outer diameter of the first and second lenses 1, 2 inserted into the lens frame 3 is identical in the second embodiment, assembling of the lens tube may be implemented with the same method when the outer diameter of the first and second lenses 1, 2 is different.

Figure 7:
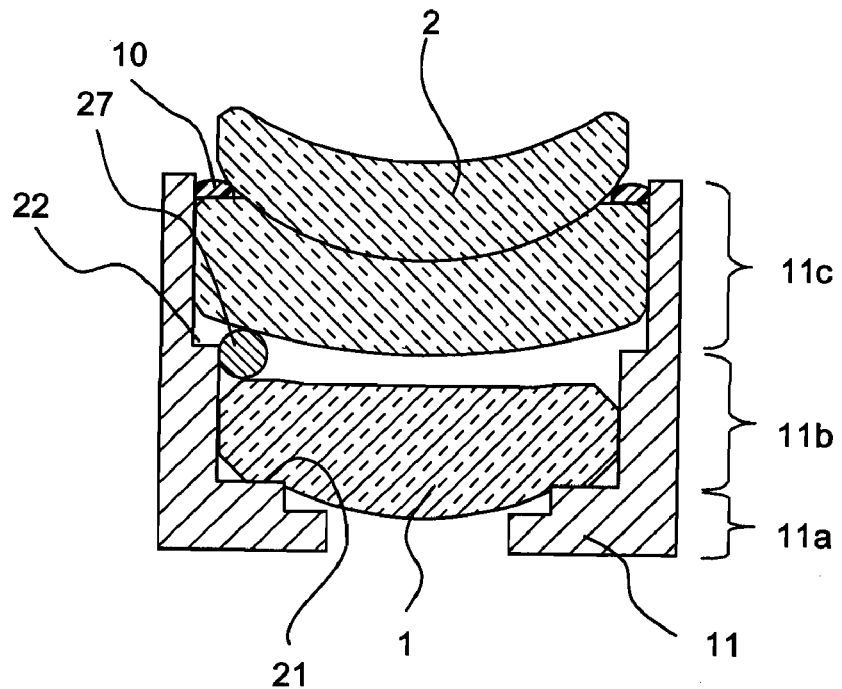
FIG. 7 is an explanatory view for explaining the method of assembling a lens tube in the case of using lenses with different diameters.

In that case, as shown in FIG. 7, using a lens frame 11 having a stage makes it possible to implement assembling of the lens tube with the same procedures as described in FIG. 4A to FIG. 4C even when the lenses of different diameters are to be used.

In the lens tube shown in FIG. 7, the lens frame 11 has a narrow diameter section 11a, a medium diameter section 11b, and a major diameter section 11c from the lower end side of the inner circumference. The peripheral section of the lens surface of the first lens 1 inserted into the medium diameter section 11b of the lens frame 11 is in contact with a step section 21 between the narrow diameter section 11a and the medium diameter section 11b. The second lens 2 is inserted into the major diameter section 11c of the lens frame 11.

The spacers 27 are dimensioned as in the aforementioned case so that the spacers 27 are placed outside the area of the effective beam which passes a lens system composed of the first and second lenses 1, 2 and that a distance between the lens surfaces of the first and second lenses 1, 2 become a predetermined distance.

While three spacers 27 are placed in the second embodiment, placement of three or more spacers 27 may be achieved by placing a plurality of the magnetism generators 8 at the positions according to the target positions of the spacers 27, and assembling them by the method similar to that shown in FIG. 4A to FIG. 4C.

Third Embodiment

Figure 8:
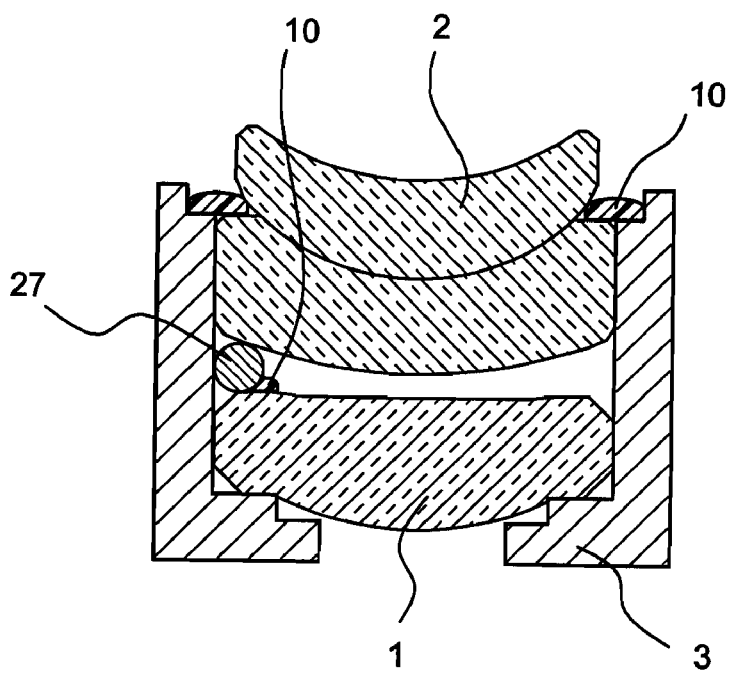
FIG. 8 is a cross sectional view of a lens tube in a third embodiment of the invention.

FIG. 8 shows a cross section of a lens tube in the third embodiment of the invention. The lens tube of the third embodiment is similar in configuration to the lens tube of the second embodiment except that the spacers are fixed to the lens with adhesives, and therefore similar component members are designated by similar reference numerals.

A lens tube shown in FIG. 8 is composed of two lenses, first and second lenses 1, 2, a cylindrical lens frame 3 for holding the first and second lenses 1, 2 with their optical axes aligned with each other, and three spherical spacers 27 which come into contact with the opposite lens surfaces of the first and second lenses 1, 2 and with the inner wall of the lens frame 3. The spacers 27 include ferromagnetic materials or ferrimagnetic materials and are fixed to the lens surface of the first lens 1 with adhesives 10.

Description is now given of the procedures in the method of assembling the lens tube shown in the third embodiment with reference to FIG. 9A to FIG. 9D. FIG. 9A to FIG. 9D are views for explaining the procedures in the method of assembling lens tube shown in the third embodiment.

Figure 9A:
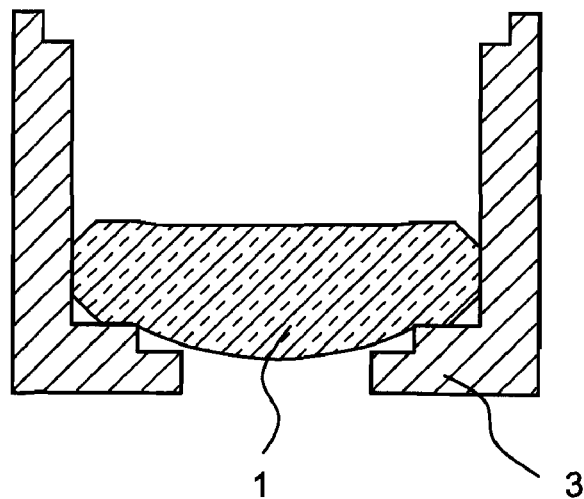
FIG. 9A is a view showing the procedures in the method of assembling the lens tube.

First, as with the assembly method shown in the second embodiment, the first lens 1 is inserted into the lens frame 3 as shown in FIG. 9A.

Figure 9B:
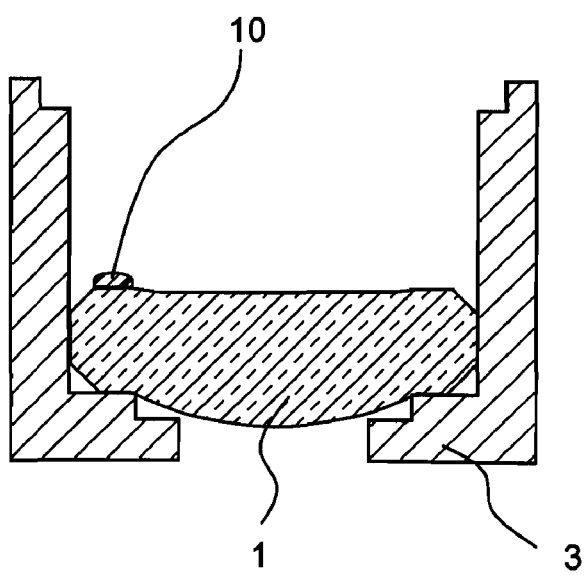
FIG. 9B is a view showing the procedures in the method of assembling the lens tube subsequent to the procedures in FIG. 9A.
Figure 9C:
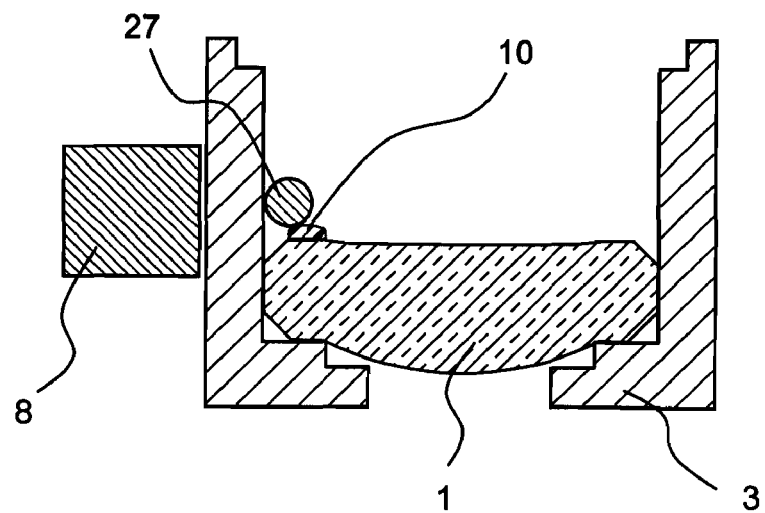
FIG. 9C is a view showing the procedures in the method of assembling the lens tube subsequent to the procedures in FIG. 9B.

Next, as shown in FIG. 9B, the adhesives 10 are applied to the position where the first lens 1 and the spacer 27 are in contact with each other, and then as shown in FIG. 9C, the spacers 27 are placed at arbitrary positions by the magnetism generators 8.

Figure 9D:
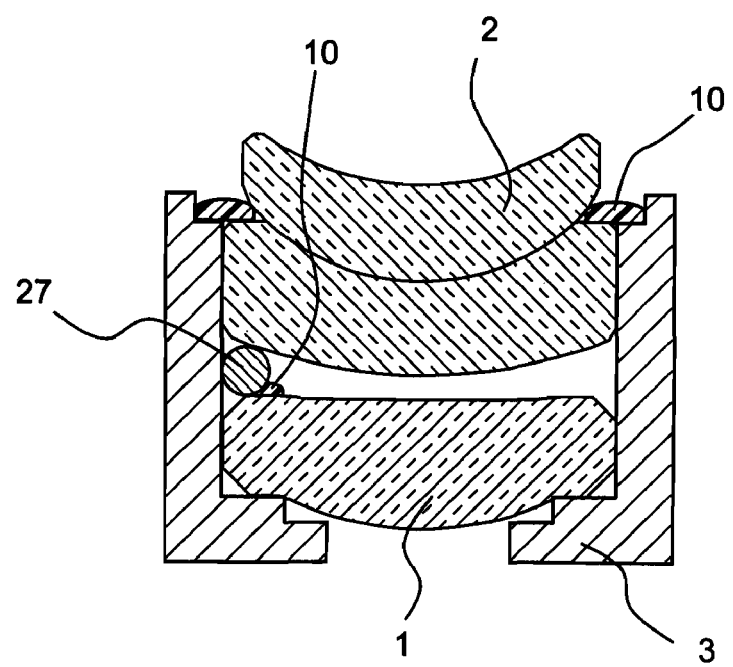
FIG. 9D is a view showing the procedures in the method of assembling the lens tube subsequent to the procedures in FIG. 9C.

Finally, as shown in FIG. 9D, the second lens 2 is inserted into the lens frame 3, and then the second lens 2 and the lens frame 3 are fixed with the adhesives 10, by which a lens tube is completed.

In the case where ultraviolet curing resin is used as the adhesives 10 as in the second embodiment, the ultraviolet curing resin should be irradiated with ultraviolet rays after completion of the step shown in FIG. 9D, so that the adhesives 10 applied to the position where the first lens 1 and the spacers 27 come into contact with each other and the adhesives 10 applied to between the second lens 2 and the lens frame 3 are hardened simultaneously.

The method of assembling the lens tube in the third embodiment has the same effect as the method of assembling the lens tube in the first embodiment.

Fixing the spacers 27 to the first lens 1 with the adhesives 10 allows the spacers 27 to be secured at predetermined positions more firmly and the shock resistance can be enhanced as compared with the case where the spacers 27 are only held in between the opposite lens surfaces of the first and second lenses 1, 2.

The same effect can also be obtained when the adhesives 10 are applied to the position where the second lens 2 and the spacers 27 are in contact with each other, and the same effect can also be obtained when the adhesives 10 are applied to both the position where the first lens 1 and the spacers 27 are in contact with each other and the position where the second lens 2 and the spacers 27 are in contact with each other.

In the case of fixing the spacers 27 to the first lens 1 or the second lens 2 with the adhesives 10, the application area of the adhesives 10 should be outside the effective beam which passes the lens system. This makes it possible to fix the spacers 27 without the adhesives 10 affecting the optical property of the lens tube.

Fourth Embodiment

Figure 10:
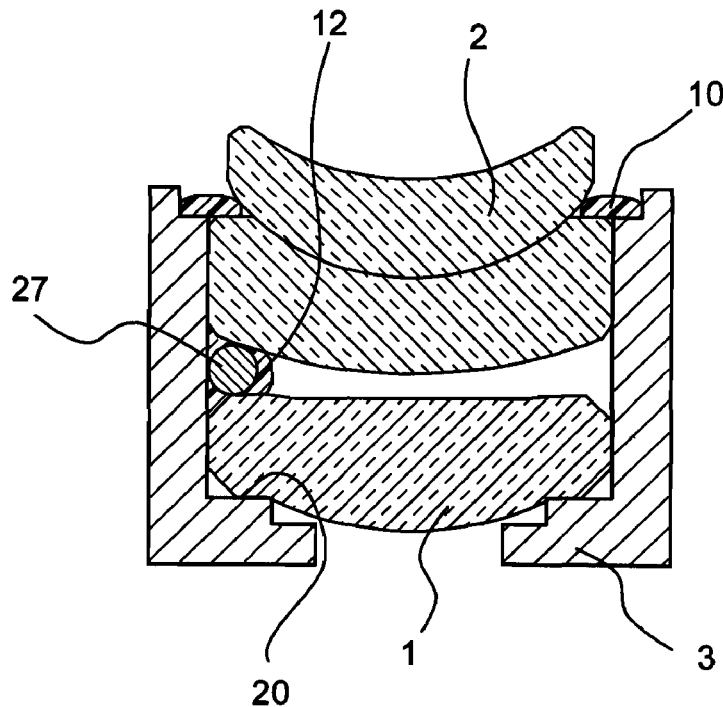
FIG. 10 is a cross sectional view of a lens tube in a fourth embodiment of the invention.

FIG. 10 is a cross sectional view of a lens tube assembled by a method of assembling a lens tube in the fourth embodiment of the invention.

A lens tube shown in FIG. 10 is composed of two lenses, first and second lenses 1, 2, a cylindrical lens frame 3 for holding the first and second lenses 1, 2 with their optical axes aligned with each other, and three spherical spacers 27 which come into contact with the opposite lens surfaces of the first and second lenses 1, 2 and with the inner wall of the lens frame 3.

The spacers 27 include ferromagnetic materials or ferrimagnetic materials and are fixed to the lens surface of the first lens 1 and the lens surface of the second lens 2 with light-shielding resin 12. Examples of the light-shielding resin 12 may include light-resistant black resin constituted of thermosetting resin such as epoxy resin doped with black pigments.

FIG. 11A to FIG. 11D are views for explaining the procedures in the method of assembling the lens tube shown in the fourth embodiment.

Figure 11A:
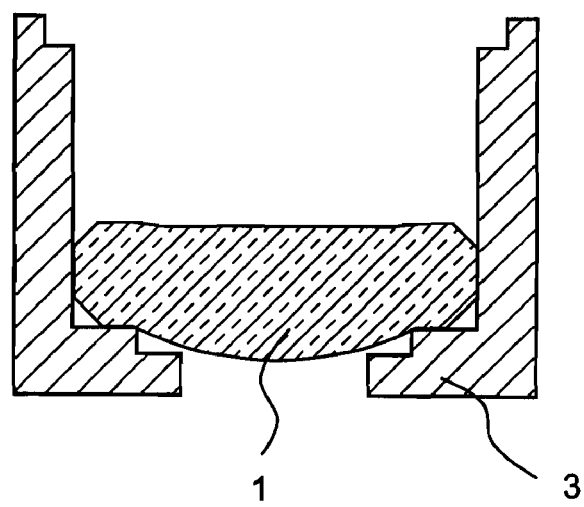
FIG. 11A is a view showing the procedures in the method of assembling the lens tube.

First, as with the assembly method shown in the second and third embodiments, the first lens 1 is inserted into the lens frame 3 as shown in FIG. 11A.

Figure 11B:
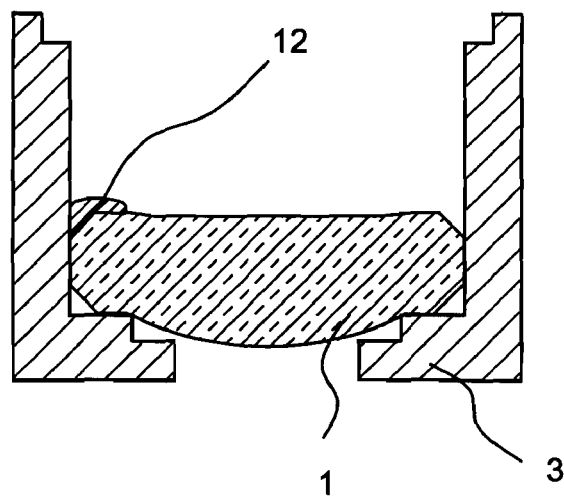
FIG. 11B is a view showing the procedures in the method of assembling the lens tube subsequent to the procedures in FIG. 11A.
Figure 11C:
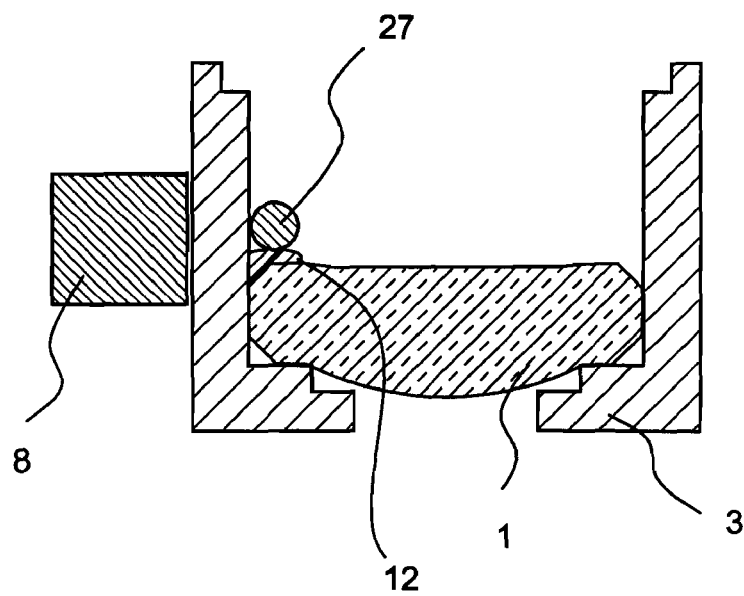
FIG. 11C is a view showing the procedures in the method of assembling the lens tube subsequent to the procedures in FIG. 11B.

Next, as shown in FIG. 11B, the light-shielding resin 12 is applied to the position where the first lens 1 and the spacers 27 are in contact with each other, and then as shown in FIG. 11C, the spacers 27 are placed at arbitrary positions by the magnetism generators 8.

Figure 11D:
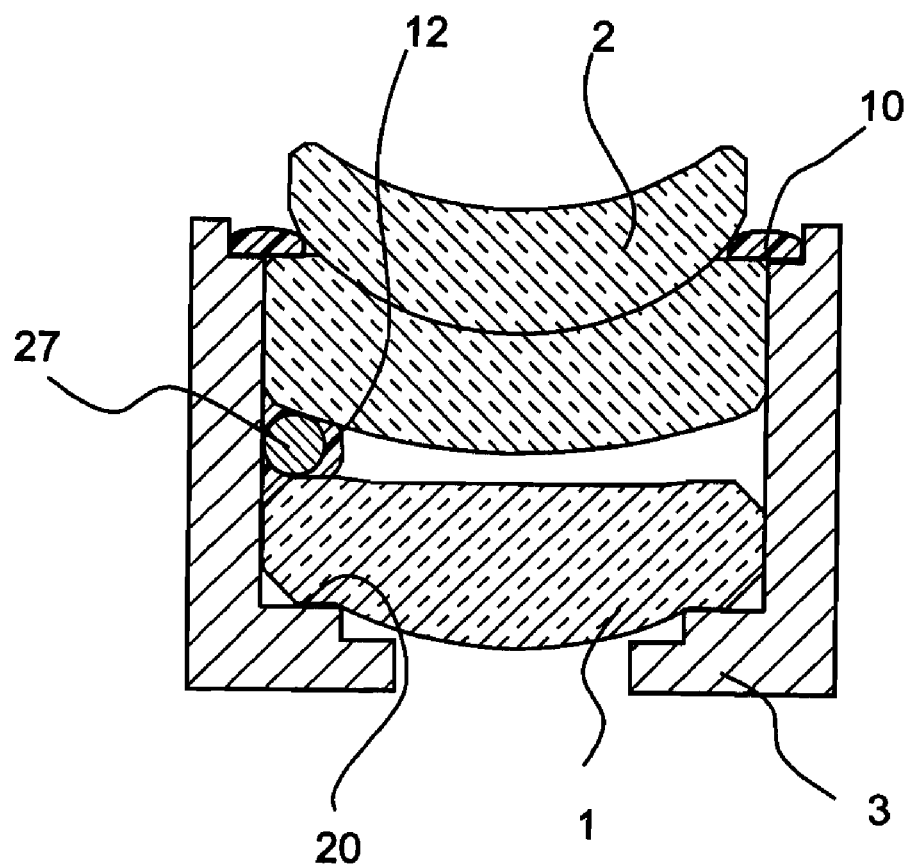
FIG. 11D is a view showing the procedures in the method of assembling the lens tube subsequent to the procedures in FIG. 11C.

Finally, as shown in FIG. 11D, after the light-shielding resin 12 is applied to the position where the second lens 2 and the spacers 27 are in contact with each other, the second lens 2 is inserted into the lens frame 3, the adhesives 10 are applied to between the second lens 2 and the lens frame 3, and the adhesives 10 and the light-shielding resin 12 are hardened, by which the lens tube is completed.

The method of assembling the lens tube in the fourth embodiment has the same effect as the method of assembling the lens tube in the second and the third embodiments.

The spacers 27 are typified by metal balls made of ferromagnetic materials or ferrimagnetic materials having a glossy surface. Accordingly, the reflected light on the surface of the spacer 27 may turn into stray light, which may affect the optical property of the lens tube.

Such stray light may be prevented, for example, by the method in which the outer circumference of the spacers are subjected to surface treatment such as blackening and delustering by plating and other techniques in order to prevent reflection of light from the ball surface. However, the method brings about problems such as increase in cost and cycle time due to the surface treatment and generation of varied outline dimensions after application of the surface treatment.

However, in the case of the method of assembling the lens tube with use of the light-shielding resin 12 shown in the third embodiment, it becomes possible to prevent stray light without applying the surface treatment to the spacers 27, so that improvement in cost and cycle time of the surface treatment can be achieved.

Moreover, the spacers 27 can reliably be fixed to the first and second lenses 1, 2 by applying the light-shielding resin 12 to the contact section between the first lens 1 and each of the spacer 27 and to the contact section between the second lens 2 and each of the spacer 27.

In this case, the application area of the light-shielding resin 12 should preferably be outside the area of the effective beam which passes the lens system composed of the first and second lenses 1, 2. This makes it possible to prevent stray light due to the spacers 27 without affecting the optical property of the lens tube.

Fifth Embodiment

Figure 12A:
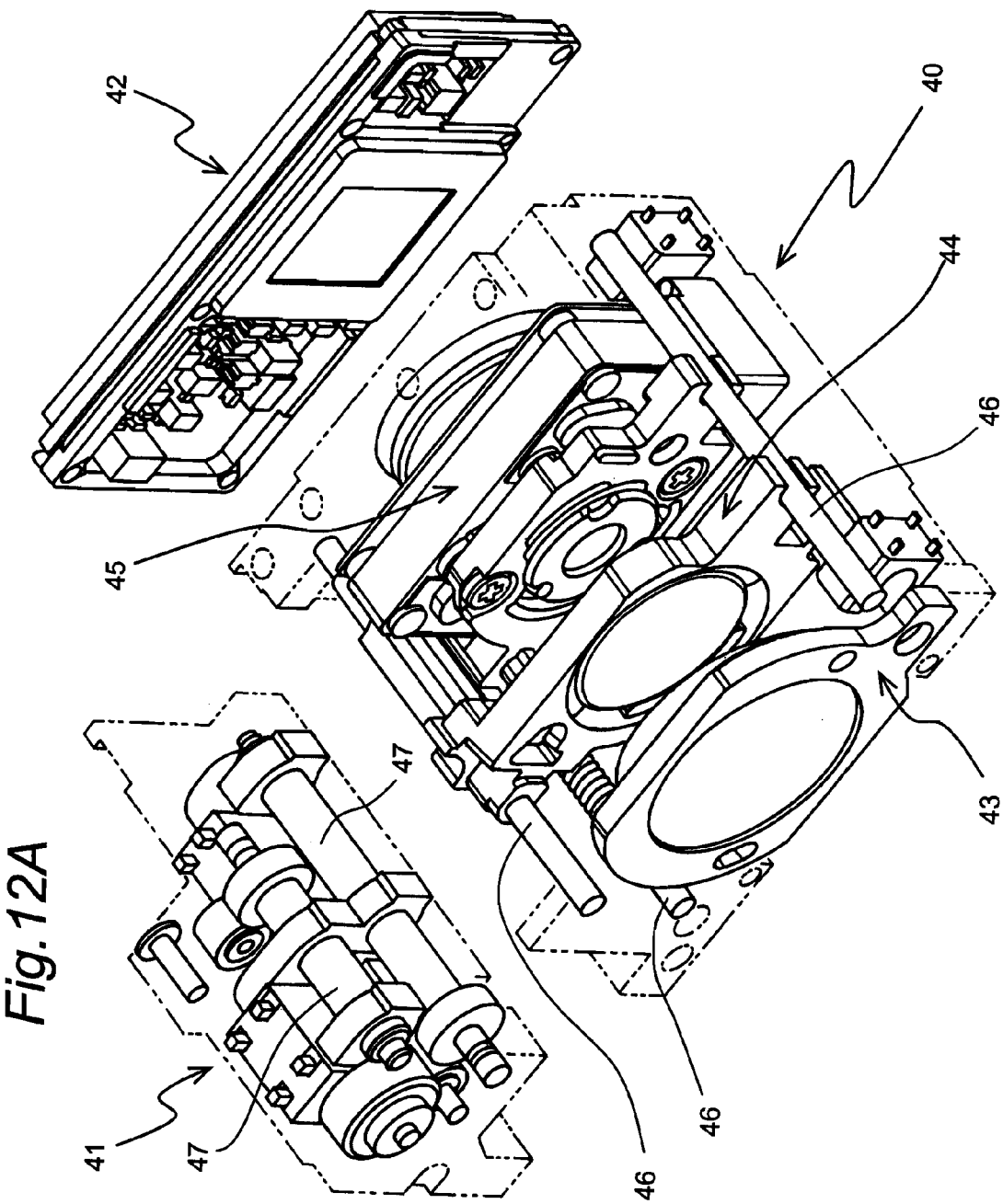
FIG. 12A is an exploded perspective view of a camera module incorporating the lens tube in the fifth embodiment of the invention.

FIG. 12A is an exploded perspective view of a camera module incorporating the lens tube in the fifth embodiment of the invention.

In FIG. 12A, reference numeral 40 denotes a lens unit, reference numeral 41 denotes a lens drive motor unit, and reference numeral 42 denotes a sensor unit having an image sensor as an example of a light receiving section. The lens unit 40 includes a first lens holder 43, a second lens holder 44, and a third lens holder 45 sequentially from the subject side. The lens unit 40 has three guide shafts 46 placed parallel with an optical axis direction at predetermined intervals. The second lens holder 44 and the third lens holder 45 are moved along with the guide shaft 46 by the lens drive motor unit 41.

Figure 12B:
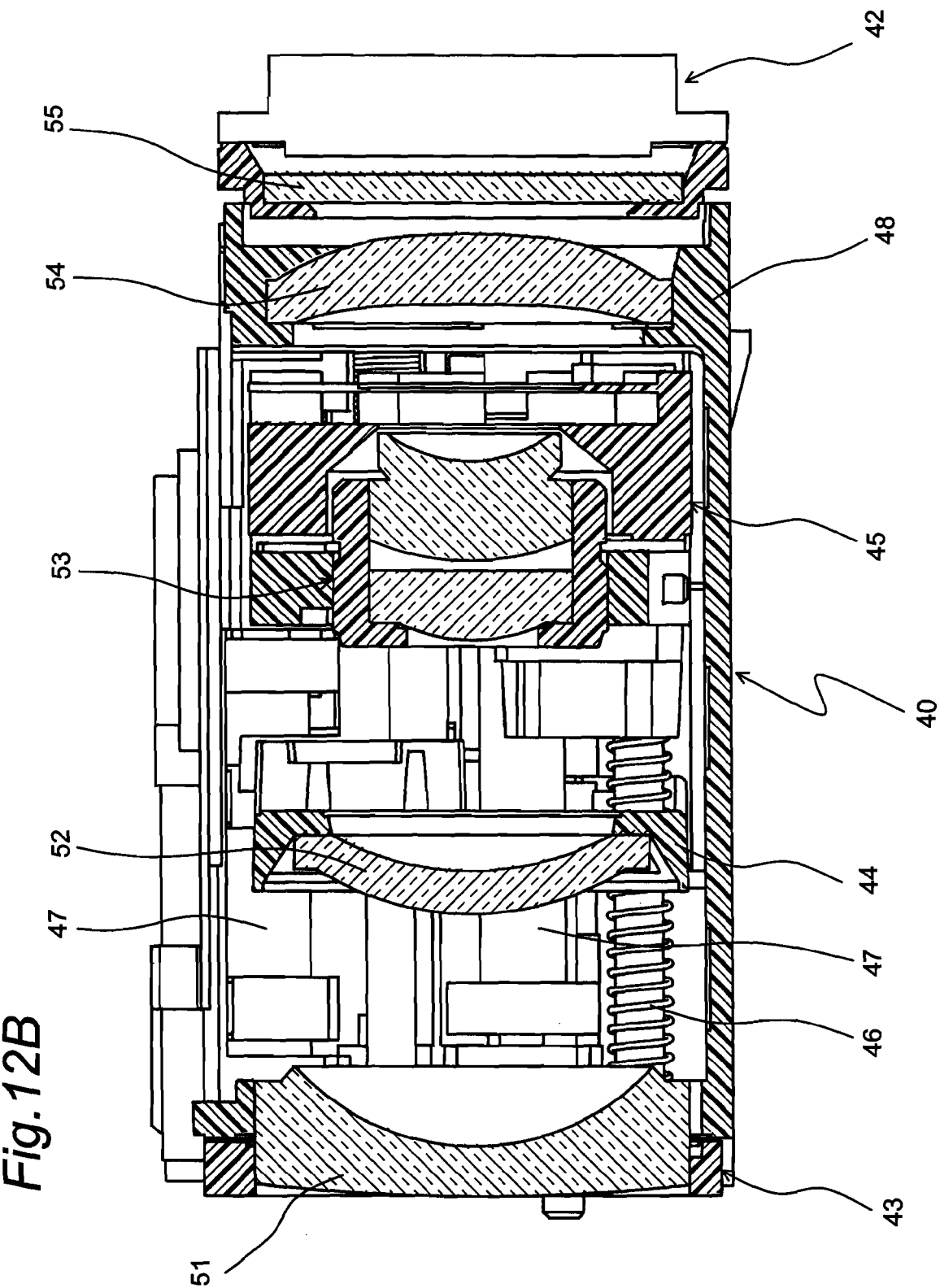
FIG. 12B is a cross sectional view of a lens unit constituting the camera module shown in FIG. 12A.

FIG. 12B shows a cross sectional view of a lens unit which constitutes the camera module. The lens unit 40 is so structured that the first lens holder 43 on the subject side holds a first lens group 51, the second lens holder 44 holds a second lens group 52, and the third lens holder 45 holds a third lens group 53. On the image pick-up side of a base section 48 of the lens unit 40, a sensor unit 42 is provided which holds a fourth lens group 54 and which has a glass cover 55. In FIG. 12B, reference numeral 47 denotes a lead screw for driving the second lens holder 44 and the third lens holder 45 along with the guide shaft 46.

In this camera module, the lens tube in the first to fourth embodiments is used for the third lens group 53 held in the third lens holder 45.

Figure 12C:
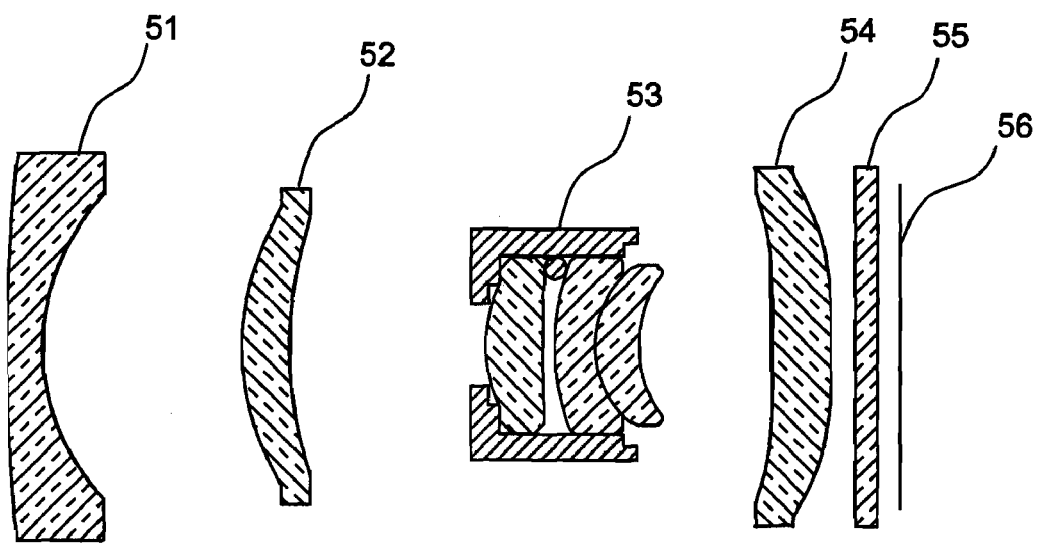
FIG. 12C is a view showing a lens system of the camera module shown in FIG. 12A.
Figure 13:
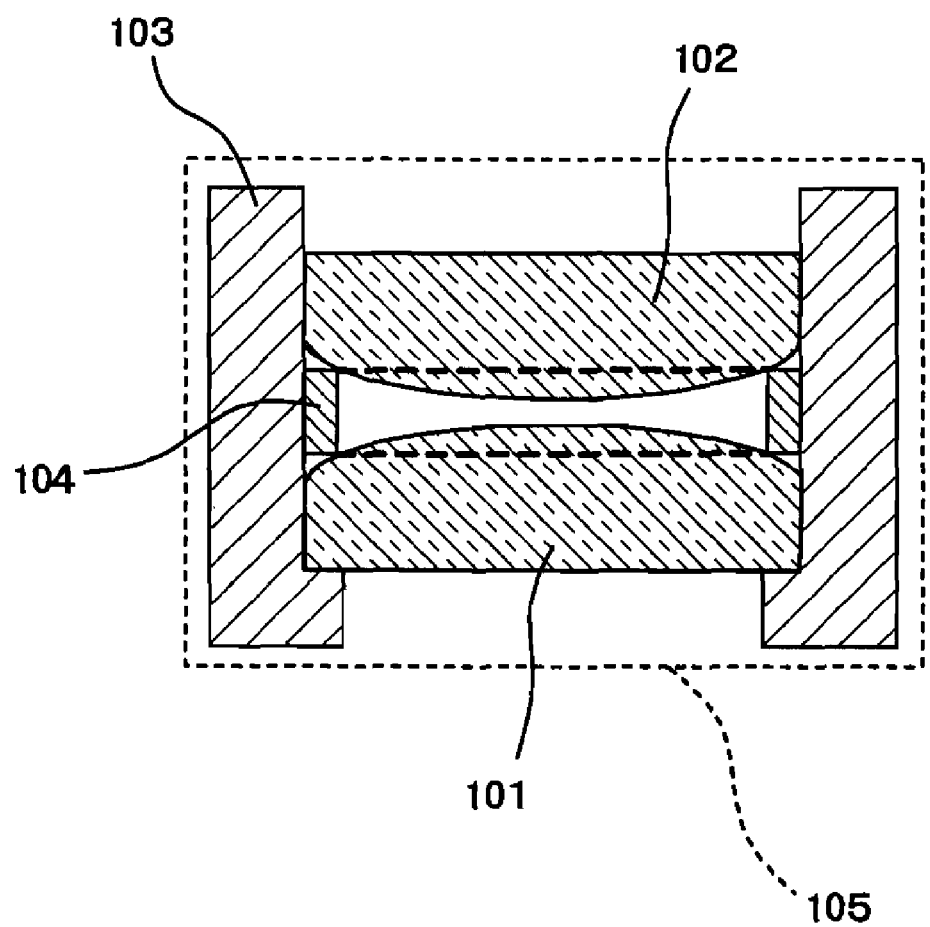
FIG. 13 is an explanatory view for explaining a conventional lens tube.
Figure 14A:
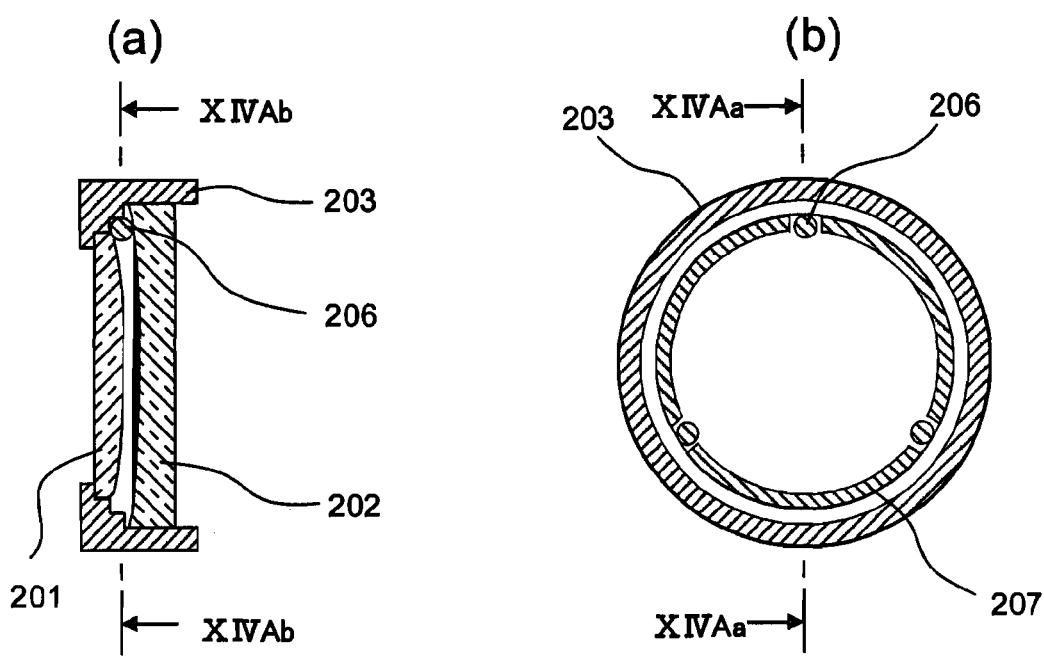
FIG. 14A is an explanatory view for explaining an example of the conventional lens tube using steel balls as spacers.
Figure 14B:
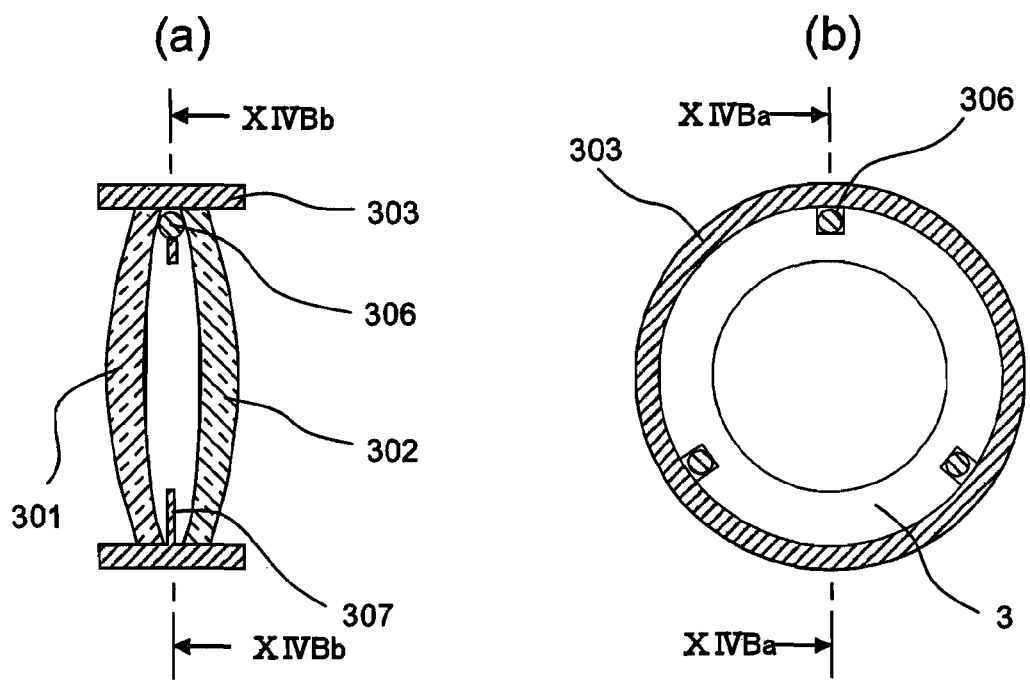
FIG. 14B is an explanatory view for explaining an example in which steel balls are used as spacers in the conventional lens tube.
Figure 15:
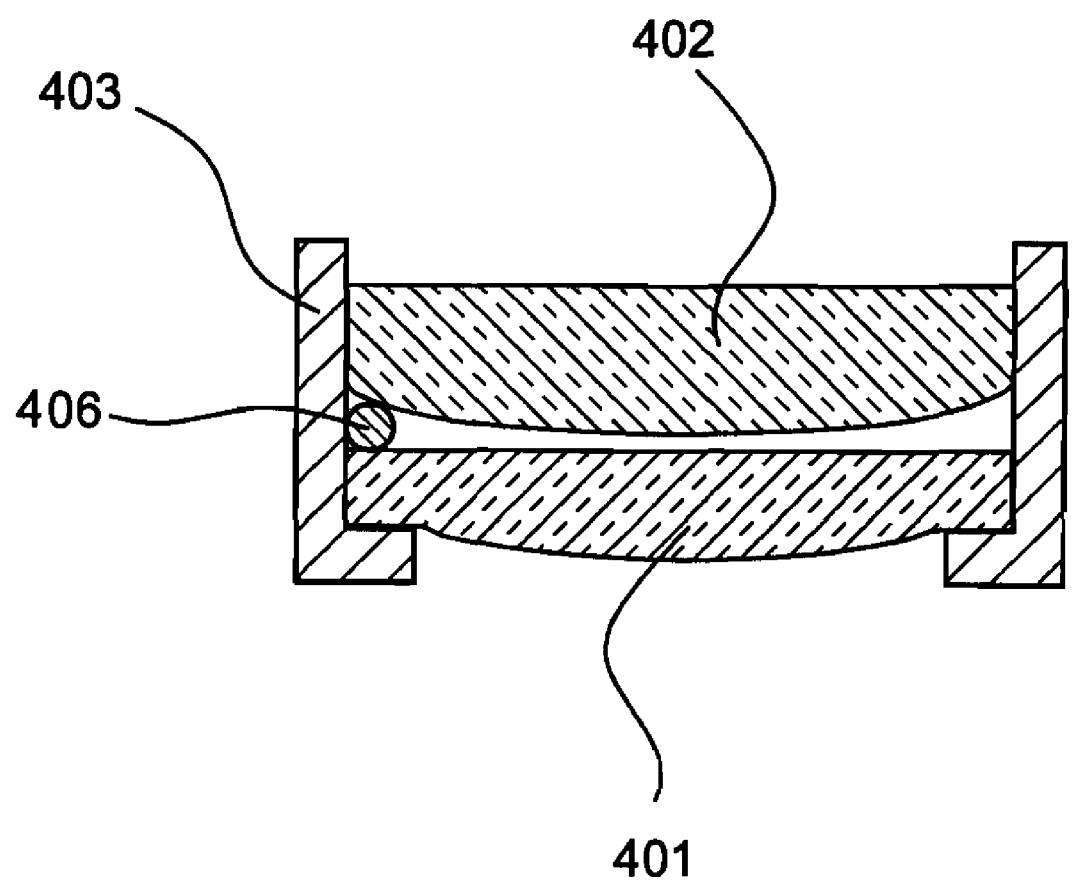
FIG. 15 is an explanatory view for explaining an example in which spacers are placed on a flat face in the conventional lens tube.

FIG. 12C shows the configuration of a lens system of the camera module. As shown in FIG. 12C, the first lens group 51, the second lens group 52, the third lens group 53, the fourth lens group 54, the glass cover 55, and the image sensor 56 are placed sequentially from the subject side on the left-hand side.

According to the lens tube explained in the first to the fourth embodiments, as in the camera module shown in FIG. 12A which has the lens system having the lens tube placed at an aperture part, the light-shielding resin prevents stray light caused by reflection from the surface of the spacers and makes it possible to prevent optical performance from being degraded even when the spacers are placed in an area where luminous flux concentrates.

Since it is not necessary to form a spacer positioning structure in the lens tube, it becomes possible to secure the effective area and to reduce the tube diameter compared with the conventional lens tubes using spacers, which results in downsizing of the entire lens system.

Sixth Embodiment

Figure 16:
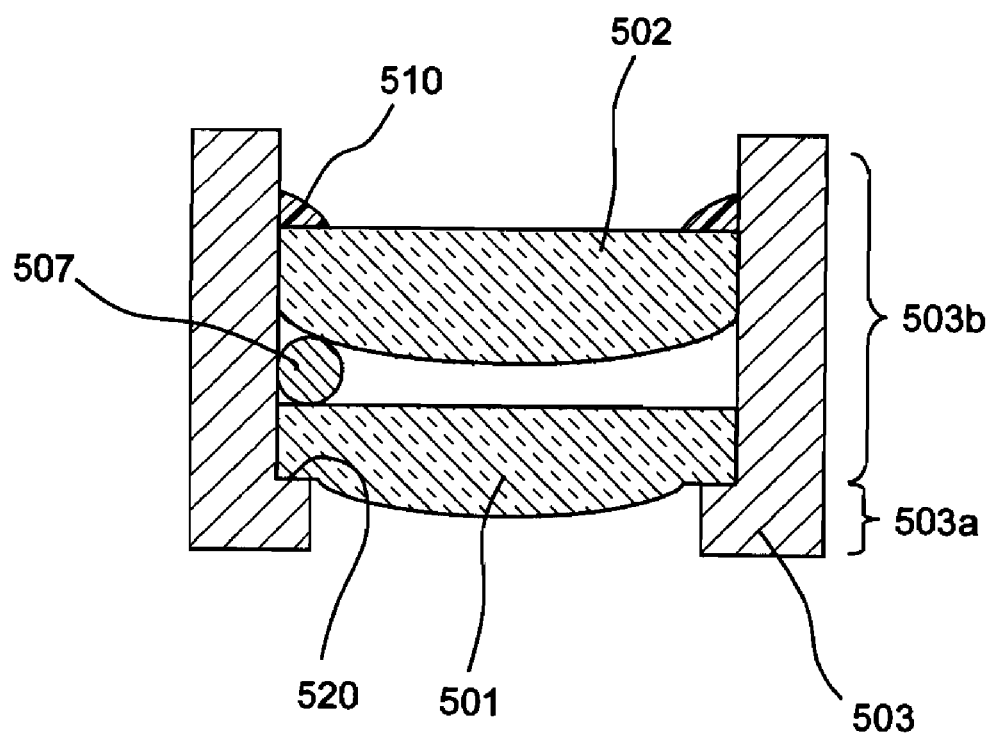
FIG. 16 is a cross sectional view of a lens tube assembled with a method of assembling a lens tube in the sixth embodiment of the invention.

FIG. 16 is a cross sectional view of a lens tube assembled by a method of assembling a lens tube in the sixth embodiment of the invention.

A lens tube shown in FIG. 16 is composed of two lenses, first and second lenses 501, 502, a cylindrical lens frame 503 for holding the first and second lenses 501, 502 with their optical axes aligned with each other, and three spherical spacers 507 which are made of magnetic materials and which come into contact with the opposite lens surfaces of the first and second lenses 501, 502 and with the inner wall of the lens frame 503. In this case, the spacers 507 are in contact with the curved surfaces of the first lens 501 and the second lens 502 and determine a distance between the first and second lenses 501, 502.

General examples of the spacers 507 include chromium balls and stainless steel balls having magnetism. Since their margin of error in outline dimension is several micrometers or some tenths of one micrometer, the precision error with respect to the lens distance between lenses can be set at several micrometers or some tenths of one micrometer.

The lens frame 503 has a step section 520 provided in the vicinity of a lower end side of the inner circumference thereof, and the step section 520 is in contact with a peripheral section of the lens surface of the first lens 501. Outside the lens frame 503, three spacer positioning magnets 508 for positioning the spacers 507 are placed at intervals of 120 degrees obtained when the circumferential direction of the lens frame 503 is divided into generally three sections. Instead of the spacer positioning magnet 508, magnetism generators such as electromagnets may be used.

Figure 17A:
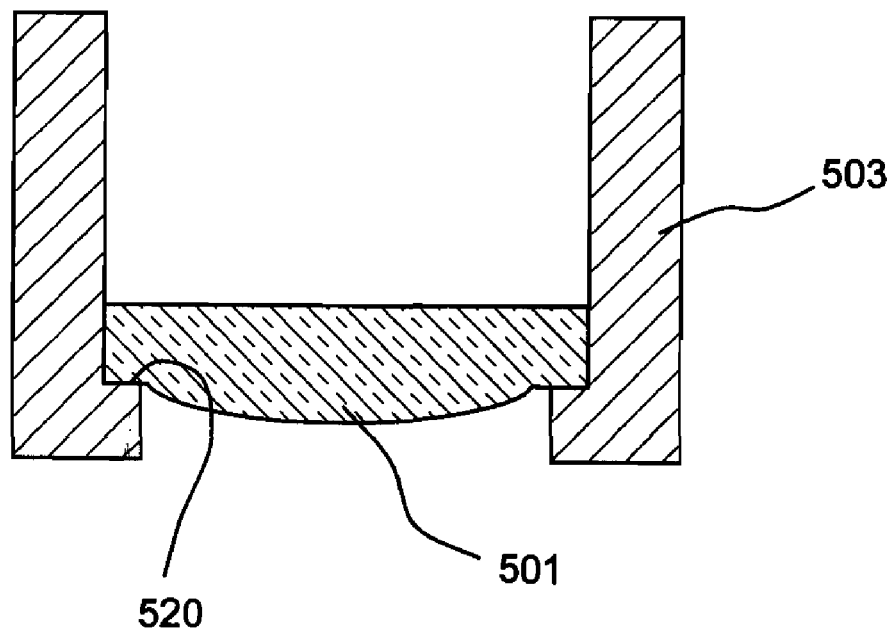
FIG. 17A is a view for procedures in the method of assembling the lens tube.
Figure 17B:
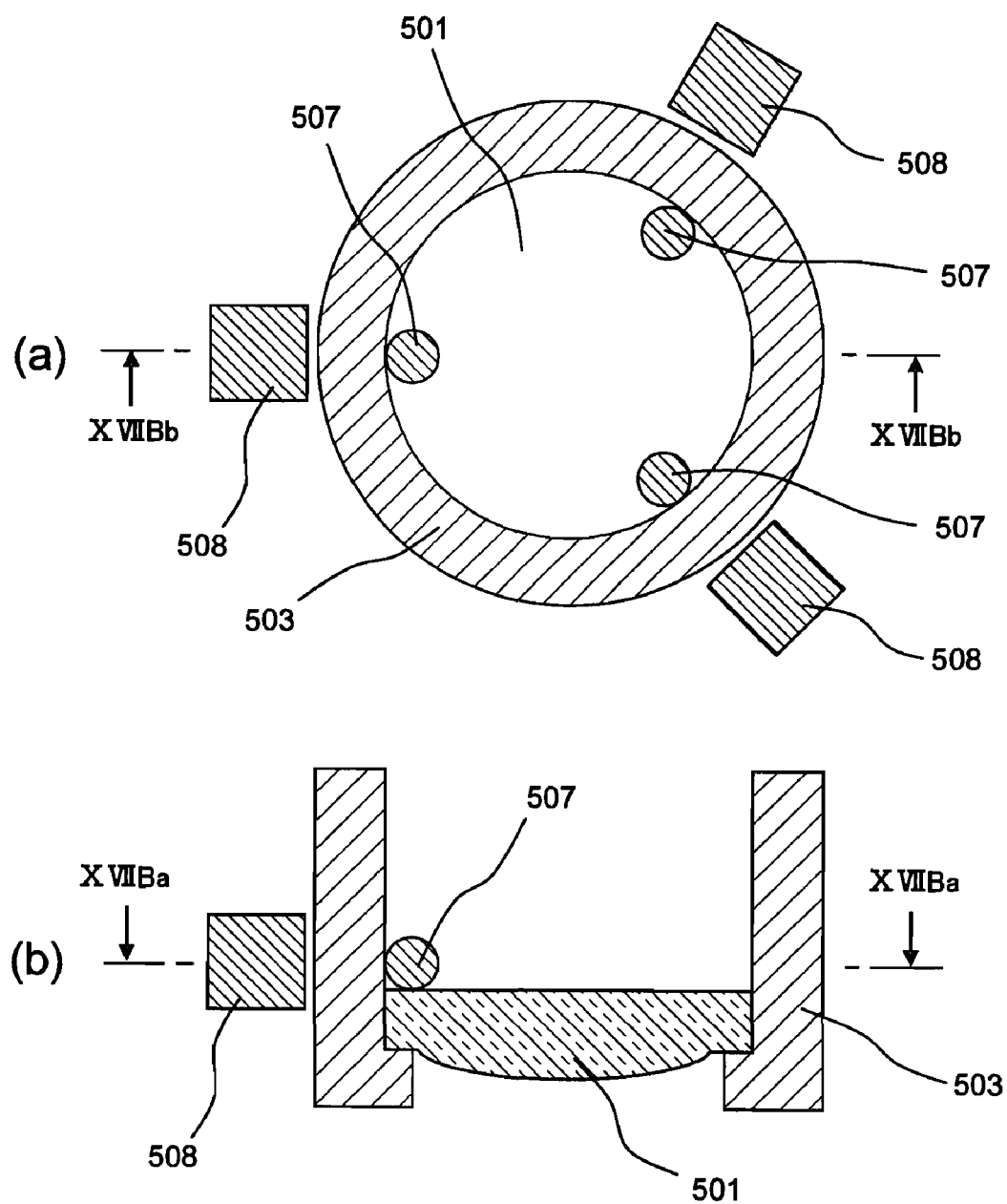
FIG. 17B is a view showing the procedures in the method of assembling the lens tube subsequent to the procedures in FIG. 17A, in which FIG. 17B(a) is a transverse cross-sectional view seen from XVIIBa-XVIIBa line of FIG. 17B(b), and FIG. 17B(b) is a vertical cross-sectional view seen from XVIIBb-XVIIBb line of FIG. 17B(a)
Figure 17C:
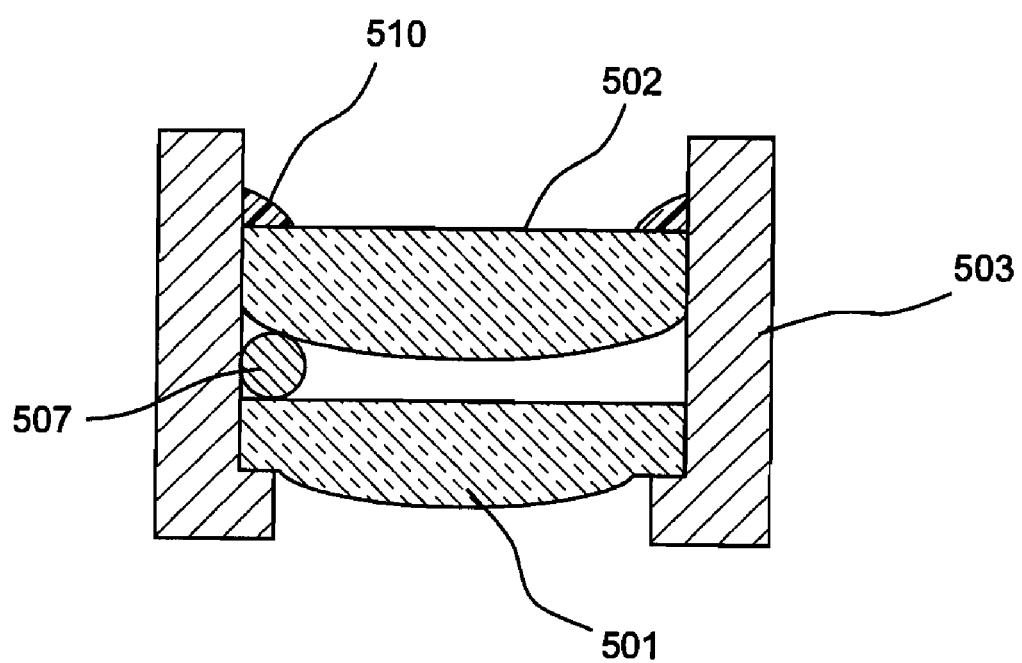
FIG. 17C is a view showing the procedures in the method of assembling the lens tube subsequent to the procedures in FIG. 17B.

Description is now given of the procedures in the method of assembling the lens tube shown in the sixth embodiment. FIG. 17A to FIG. 17C are views for explaining the procedures in the method of assembling the lens tube shown in the sixth embodiment. FIG. 17B(a) is a cross sectional view seen from XVIIBa-XVIIBa line of FIG. 17B(b), and FIG. 17B(b) is a cross sectional view seen from XVIIBb-XVIIBb line of FIG. 17B(a).

First, as shown in FIG. 17A, the first lens 501 is inserted into the lens frame 503. The step section 520 on the inner circumference of the lens frame 503 comes into contact with a peripheral section of one lens surface of the first lens 501.

If the inside diameter of the lens frame 503 is larger than the outer diameter of the first and second lenses 501, 502, a space is generated between the inner wall of the lens frame 503 and the first and second lenses 501, 502, and thereby the first lens 501 and the second lens 502 become out of alignment after the assembling process. Therefore, it is necessary to make the inside diameter of the lens frame 503 equal to or smaller than the outline of the first and second lenses 501, 502.

Next, as shown in FIG. 17B, the spacers 507 are placed in the lens frame 503.

In this case, the spacers 507 are attracted to the spacer positioning magnets 508 placed outside the lens frame 503, come into contact with the inner wall of the lens frame 503, and are positioned at equidistant positions obtained when the circumferential direction of the first and second lenses 1, 2 are divided into generally three sections.

In this case, when the spacers 507 are placed in the lens frame 503 with use of a holder such as tweezers, the spacers 507 may be drawn to unintended directions unless the respective spacers 507 are held in the vicinity of target positions because a plurality of the spacer positioning magnets 508 are placed.

Figure 18:
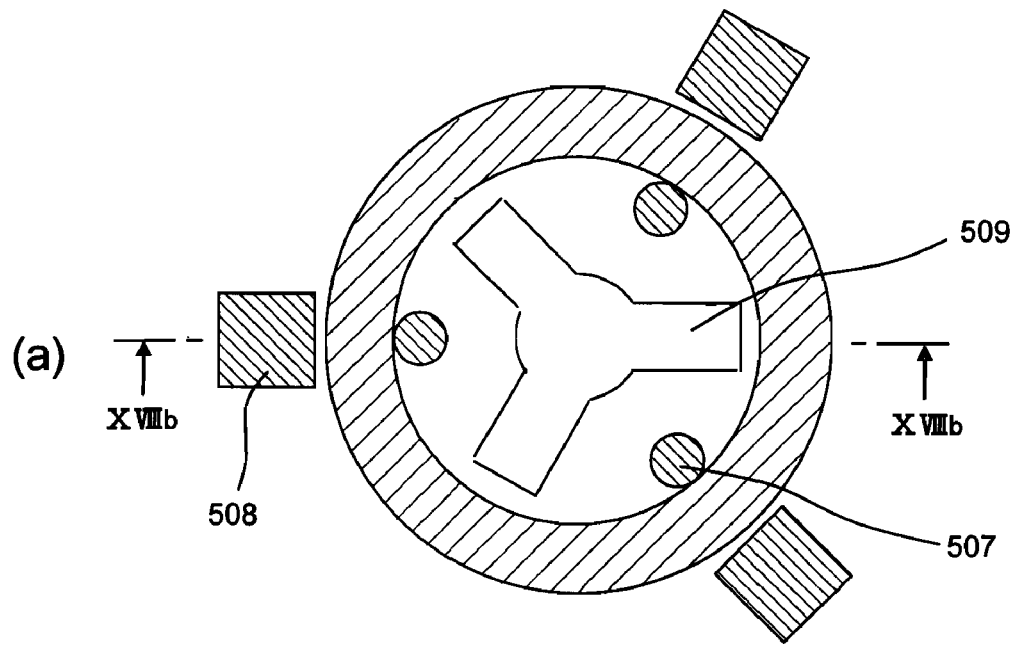
Figure 18:
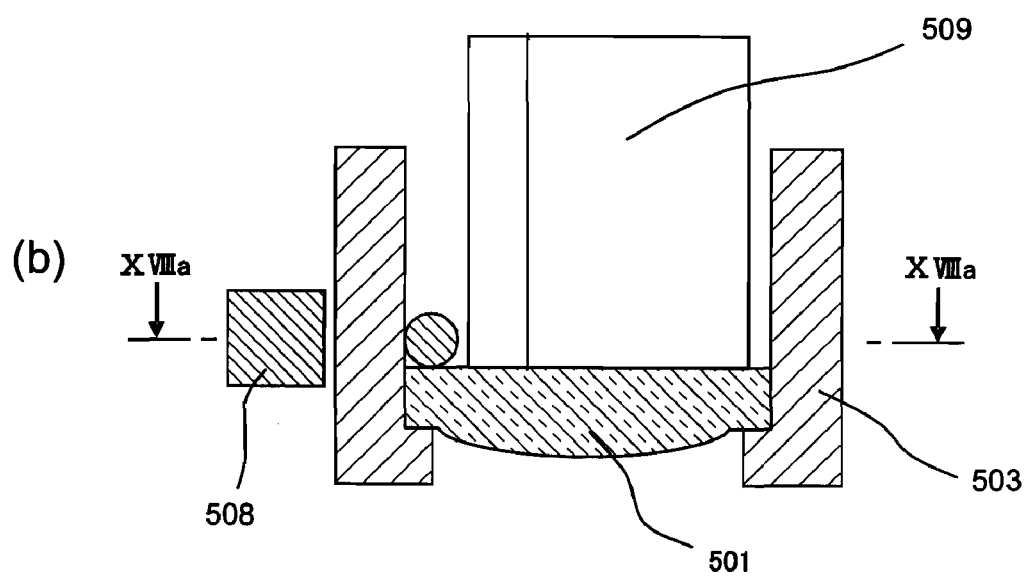

As a solution, a spacer guide 509 shown in FIG. 18A and FIG. 18B is used. FIG. 18A is a cross sectional view seen from XVIIIa-XVIIIa line of FIG. 18B, and FIG. 18B is a cross sectional view seen from XVIIIb-XVIIIb line of FIG. 18A. Use of the spacer guide 509 enables the respective spacers 507 to be inserted into the lens frame 503 through the spacer guide 509, so that it becomes possible to easily position the spacers 507 at positions attracted by each spacer positioning magnet 508 without the necessity of holding the spacers 507 in the vicinity of the target positions.

The materials used for the spacer guide 509 should be paramagnetic materials or diamagnetic materials which negate the influence of the magnetization by the spacer positioning magnet 508 so that the spacers 507 are prevented from being attracted to the spacer guide 509.

The materials used for the lens frame 503 should be paramagnetic materials or diamagnetic materials which can negate the influence of the magnetization by the spacer positioning magnet 508 so that the spacers 507 are prevented from being attracted to the lens frame 503.

Concrete examples of the nonmagnetic materials used for the lens frame 503 include resin materials such as polycarbonate, though any paramagnetic material or diamagnetic material may be used as long as the influence of the magnetization by the spacer positioning magnet 508 can be negated.

The spacers 507 are dimensioned so that the spacers 507 are placed outside the effective diameter of the lenses and a distance between the lens surfaces of the first and second lens 501, 502 is a predetermined distance.

Next, as shown in FIG. 17C, the second lens 502 is inserted into the lens frame 503, and the second lens 502 and the lens frame 503 are fixed with the adhesives 510, by which a lens tube is completed.

In fixing lenses in the assembling process of the lens tube, ultraviolet curing resin is generally used as adhesives. In this case, after ultraviolet curing resin is applied to between the second lens 502 and the lens frame 503, the ultraviolet curing resin should be irradiated with ultraviolet rays for hardening.

Using the above-explained method of assembling the lens tube enables the spacer positioning magnets 508 provided outside the lens frame 503 to regulate the motion of the spacers 507, so that it becomes possible to easily position the spacers 507 at predetermined positions.

Since the motion of the spacers 507 are regulated by the spacer positioning magnets 508 with the spacers 507 being in contact with the inner wall of the lens frame 503, the spacers 507 will not be separated from the inner wall of the lens frame 503 in the subsequent assembling process, so that it becomes possible to prevent inclination of the lenses due to displacement of the points of contact between the first and second lenses 501, 502 and the spacers 507.

According to the method of assembling the lens tube, the spacers 507 which are made of magnetic materials are attracted to predetermined positions with the magnetic force of the spacer positioning magnets 508 placed outside the lens frame 503 so that the motion of the spacers 507 are regulated. Consequently, it becomes possible to easily place the spacers 507 in between the first and second lenses 501, 502 so that the spacers 507 do not move during the assembling process, and to keep the distance between the lenses with high precision while reliably preventing inclination of the first and second lenses 501, 502 in the lens frame 503.

Moreover, the spacer positioning magnets 508 having magnetic poles of the same number as the spacers 507 placed on the first lens 501 are placed outside the lens frame 503 at equal intervals in the circumferential direction, so that the spacers 507 may be placed within the lens frame 503 at equal intervals in the circumferential direction.

In the method of assembling the lens tube, using the spacer guide 509 for placing the spacers 507 at prescribed positions makes it possible to easily position the spacers 507 at predetermined positions.

Placing the spherical spacers 507 outside the effective diameter of the first and second lenses 501, 502 makes it possible to conduct high-precision assembling without affecting the optical property of the lens tube.

Although the outer diameter of the first and second lenses 501, 502 inserted into the lens frame 503 is identical in the sixth embodiment, assembling of the lens tube may be implemented with the same method when the outer diameter of the first and second lenses 501, 502 is different.

Figure 19:
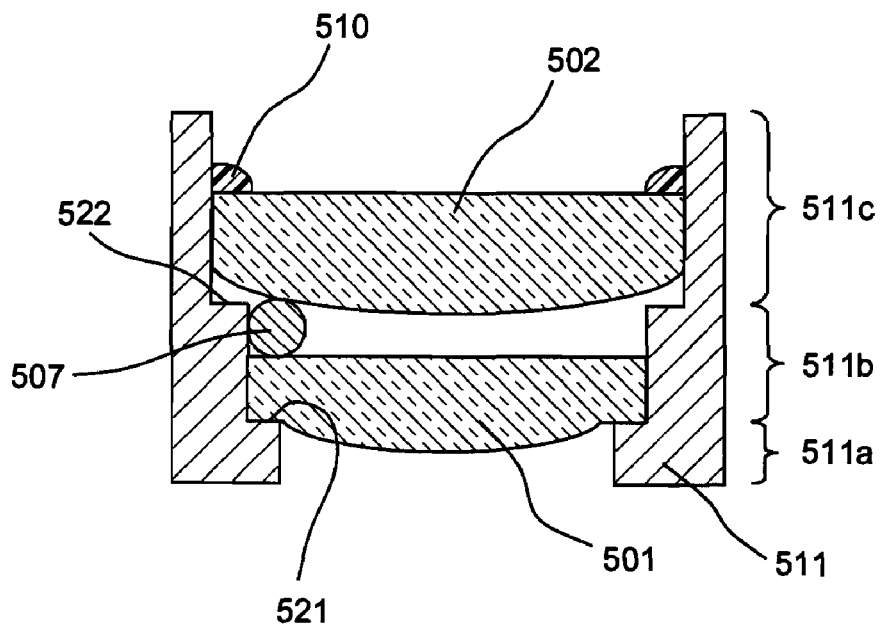
FIG. 19 is an explanatory view for explaining the method of assembling a lens tube in the case of using lenses with different diameters.

In that case, as shown in FIG. 19, using a lens frame 511 having a stage makes it possible to implement assembling of the lens tube with the same procedures as described in FIG. 17 even when the lenses of different diameters are to be used.

In the lens tube shown in FIG. 19, the lens frame 511 has a narrow diameter section 511a, a medium diameter section 511b, and a major diameter section 511c from the lower end side of the inner circumference. The peripheral section of the lens surface of the first lens 501 inserted into the medium diameter section 511b of the lens frame 511 is in contact with a step section 521 between the narrow diameter section 511a and the medium diameter section 511b. The second lens 502 is inserted into the major diameter section 511c of the lens frame 511.

The spacers 507 are dimensioned as in the aforementioned case so that the spacers 507 are placed outside the effective diameter of the lenses and that a distance between the lens surfaces of the first and second lenses 501, 502 become a predetermined distance.

While three spacers 507 are placed in the sixth embodiment, placement of three or more spacers 507 may be achieved by placing a plurality of the spacer positioning magnets 508 at the positions according to the target positions of the spacers 507, and assembling them with the method similar to that shown in FIG. 17A to FIG. 17C.

Seventh Embodiment

Figure 20:
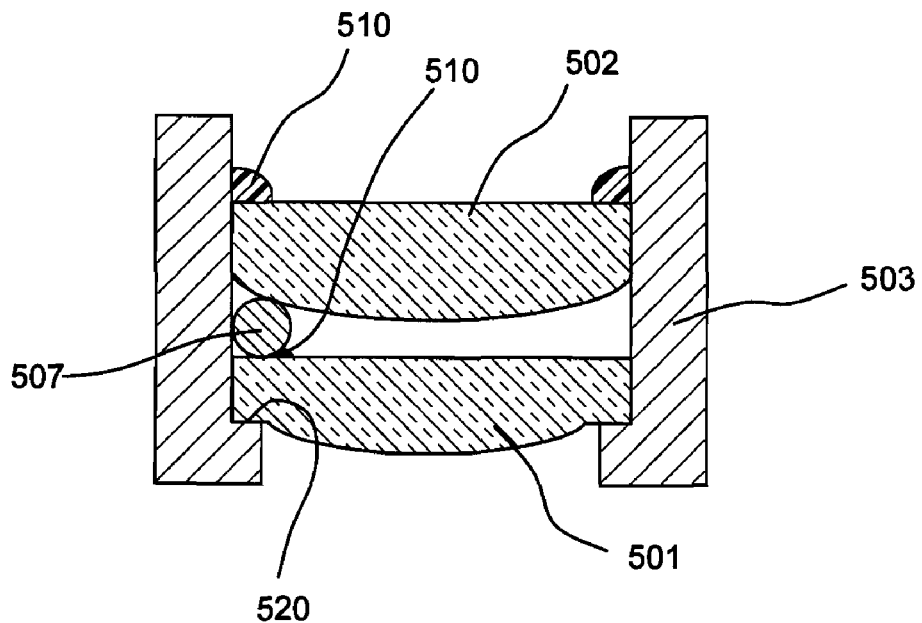
FIG. 20 is a cross sectional view of a lens tube assembled by a method of assembling a lens tube in a seventh embodiment of the invention.

FIG. 20 is a cross sectional view of a lens tube assembled by a method of assembling a lens tube in the seventh embodiment of the invention. The method of assembling the lens tube of the seventh embodiment is similar in constitution to the method of assembling the lens tube of the sixth embodiment except that the spacers are fixed to the lens with adhesives, and therefore similar component members are designated by similar reference numerals.

A lens tube shown in FIG. 20 is composed of two lenses, first and second lenses 501, 502, a cylindrical lens frame 503 for holding the lenses with their optical axes aligned with each other, and three spherical spacers 507 which are made of magnetic materials and which come into contact with the opposite lens surfaces of the first and second lenses 501, 502 and with the inner wall of the lens frame 503. The spacers 507 are fixed to the lens surface of the first lens 501 with adhesives 510.

Description is now given of the procedures in the method of assembling the lens tube shown in the seventh embodiment with reference to FIG. 21A to FIG. 21D. FIG. 21A to FIG. 21D are views for explaining the procedures in the method of assembling the lens tube shown in the seventh embodiment.

Figure 21A:
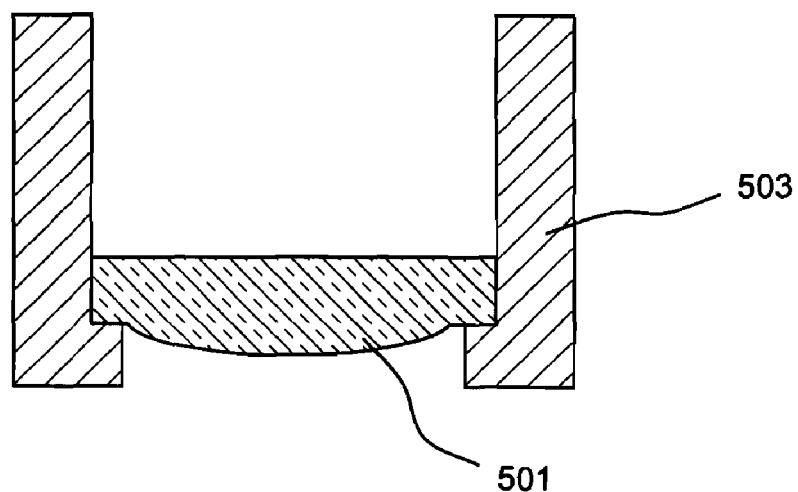
FIG. 21A is a view showing the procedures in the method of assembling the lens tube.

First, as with the assembly method shown in the sixth embodiment, the first lens 501 is inserted into the lens frame 503 as shown in FIG. 21A.

Figure 21B:
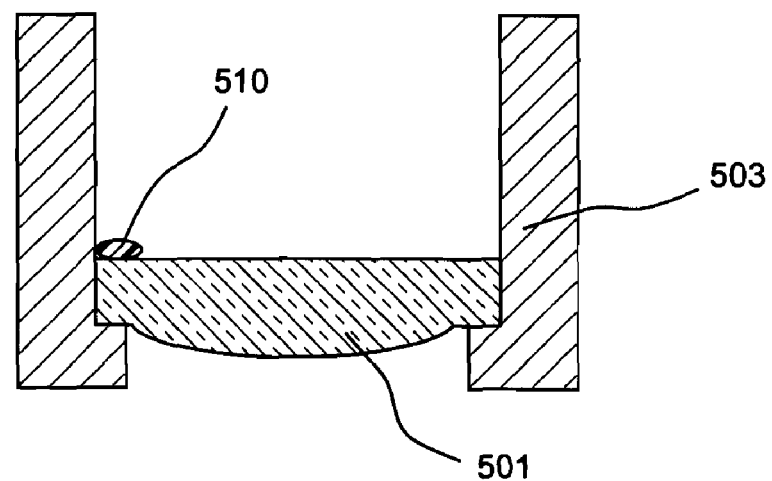
FIG. 21B is a view showing the procedures in the method of assembling the lens tube subsequent to the procedures in FIG. 21A.
Figure 21C:
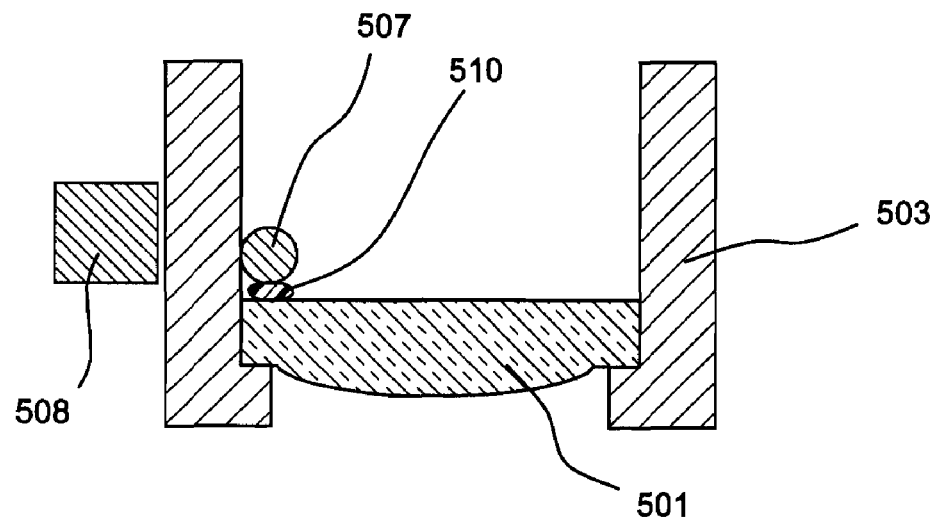
FIG. 21C is a view showing the procedures in the method of assembling the lens tube subsequent to the procedures in FIG. 21B.

Next, as shown in FIG. 21B, the adhesives 510 are applied to the position where the first lens 501 and the spacers 507 are in contact with each other, and then as shown in FIG. 21C, the spacers 507 are placed at arbitrary positions by the spacer positioning magnets 508.

Figure 21D:
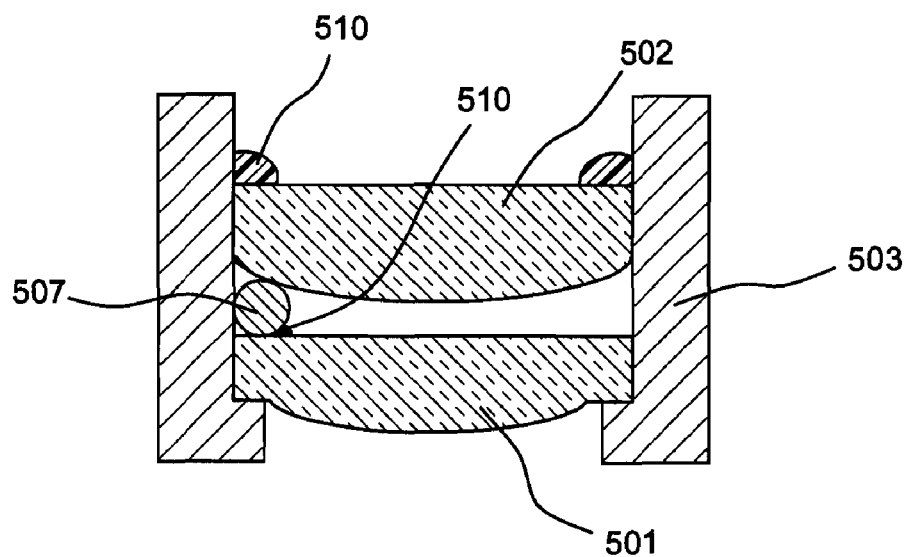
FIG. 21D is a view showing the procedures in the method of assembling the lens tube subsequent to the procedures in FIG. 21C.

Finally, as shown in FIG. 21D, the second lens 502 is inserted into the lens frame 503, and then the second lens 502 and the lens frame 503 are fixed with the adhesives 510, by which a lens tube is completed.

In the case where ultraviolet curing resin is used as the adhesives 510 as in the sixth embodiment, the ultraviolet curing resin should be irradiated with ultraviolet rays after completion of the step shown in FIG. 21D, so that the adhesives 510 applied to the position where the first lens 501 and the spacers 507 are in contact with each other and the adhesives 510 applied to between the second lens 502 and the lens frame 503 are hardened simultaneously.

The method of assembling the lens tube in the seventh embodiment has the same effect as the method of assembling the lens tube in the sixth embodiment.

Fixing the spacers 507 to the first lens 501 with the adhesives 510 allows the spacers 507 to be secured at predetermined positions more firmly as compared with the case where the spacers 507 are only held in between the opposite lens surfaces of the first and second lenses 501, 502.

The same effect can also be obtained when the adhesives 510 are applied to the position where the second lens 502 and the spacers 507 are in contact with each other, and the same effect can also be obtained when the adhesives 510 are applied to both the position where the first lens 501 and the spacers 507 are in contact with each other and the position where the second lens 502 and the spacers 507 are in contact with each other.

In the case of fixing the spacer 507 to the first lens 501 or the second lens 502 with the adhesives 510, the application area of the adhesives 510 should be outside the effective diameter of the lenses. This makes it possible to fix the spacers 507 without the adhesives 510 affecting the optical property of the lens tube.

Eighth Embodiment

Figure 22:
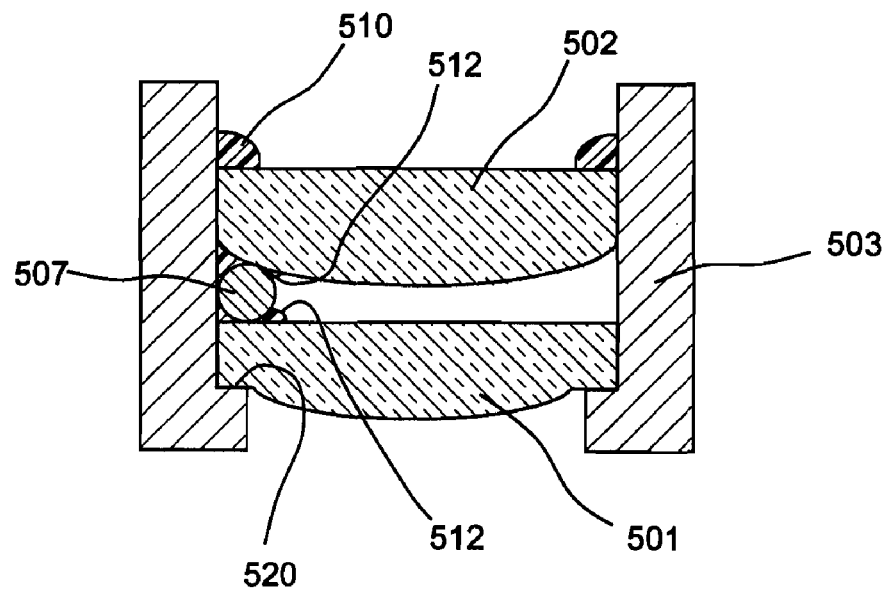
FIG. 22 is a cross sectional view of a lens tube assembled with the method of assembling a lens tube in an eighth embodiment of the invention.

FIG. 22 is a cross sectional view of a lens tube assembled by a method of assembling a lens tube in the eighth embodiment of the invention.

A lens tube shown in FIG. 22 is composed of two lenses, first and second lenses 501, 502, a cylindrical lens frame 503 for holding the lenses with their optical axes aligned with each other, and three spherical spacers 507 which are made of magnetic materials and which come into contact with the opposite lens surfaces of the first and second lenses 501, 502 and with the inner wall of the lens frame 503.

The spacers 507 are fixed to the lens surface of the first lens 501 and the lens surface of the second lens 502 with light-shielding resin 512. Examples of the light-shielding resin 512 may include light-resistant black resin constituted of thermosetting resin such as epoxy resin doped with black pigments.

FIG. 23A to FIG. 23D are views for explaining the procedures in the method of assembling the lens tube shown in the eighth embodiment.

Figure 23A:
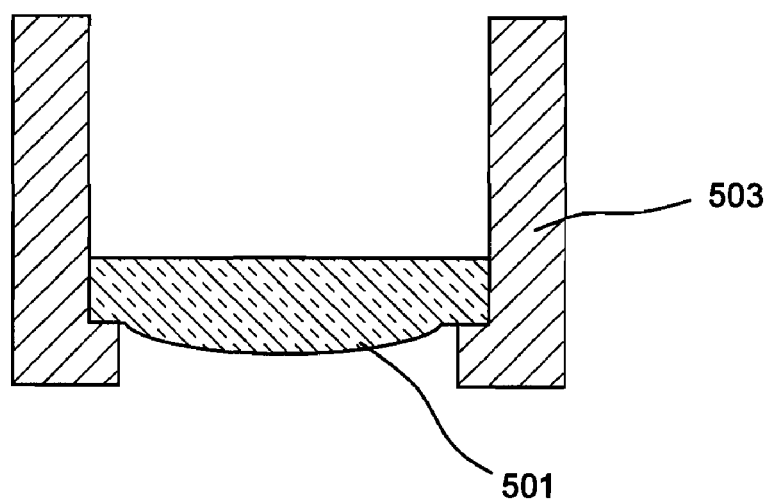
FIG. 23A is a view showing the procedures in the method of assembling the lens tube.

First, as with the assembly method shown in the sixth and seventh embodiments, the first lens 501 is inserted into the lens frame 503 as shown in FIG. 23A.

Figure 23B:
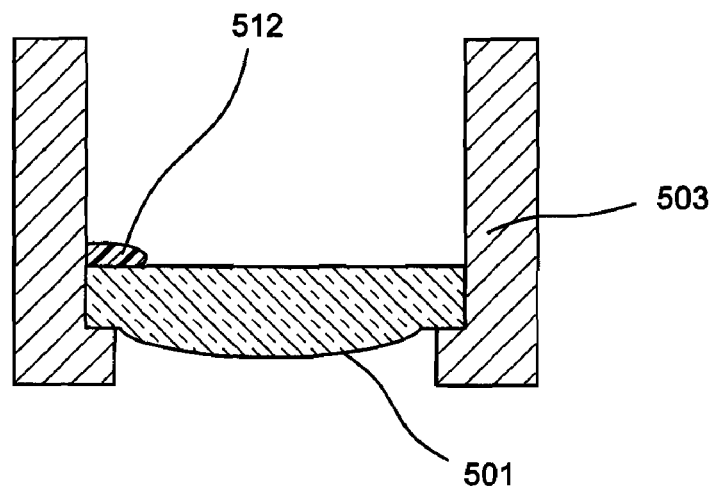
FIG. 23B is a view showing the procedures in the method of assembling the lens tube subsequent to the procedures in FIG. 23A.
Figure 23C:
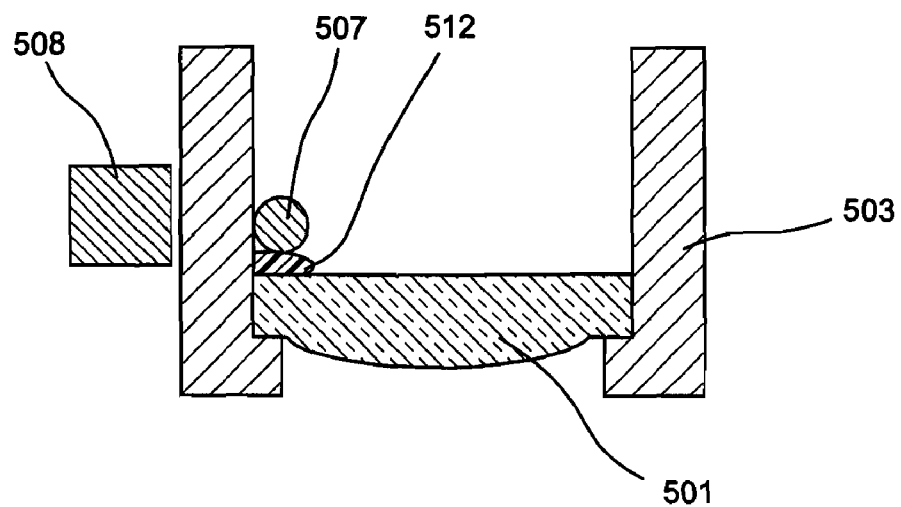
FIG. 23C is a view showing the procedures in the method of assembling the lens tube subsequent to the procedures in FIG. 23B.

Next, as shown in FIG. 23B, the light-shielding resin 512 is applied to the position where the first lens 501 and the spacers 507 are in contact with each other, and then as shown in FIG. 23C, the spacers 507 are placed at arbitrary positions by the spacer positioning magnet 508.

Figure 23D:
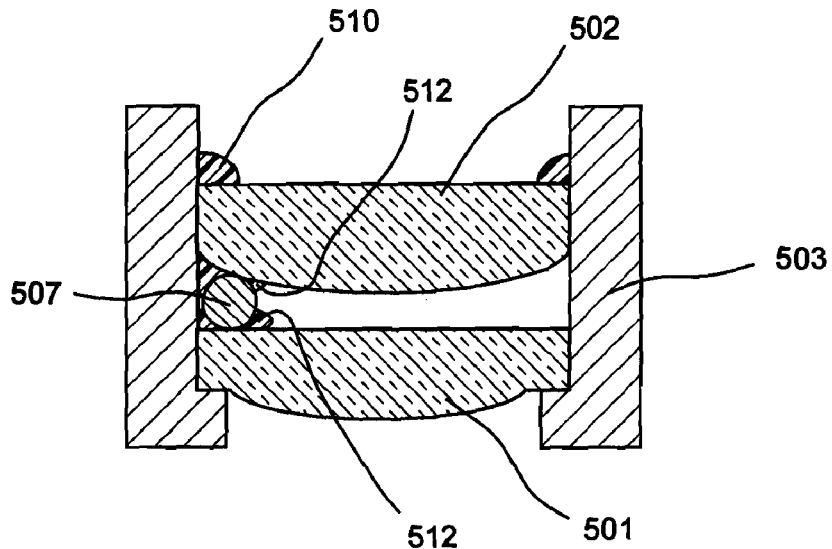
FIG. 23D is a view showing the procedures in the method of assembling the lens tube subsequent to the procedures in FIG. 23C.

Finally, as shown in FIG. 23D, after the light-shielding resin 512 is applied to the position where the second lens 502 and the spacers 507 are in contact with each other, the second lens 502 is inserted into the lens frame 503, the adhesives 510 are applied to between the second lens 502 and the lens frame 503, and the adhesives 510 and the light-shielding resin 512 are hardened, by which the lens tube is completed.

The method of assembling the lens tube in the eighth embodiment has the same effect as the method of assembling the lens tube in the sixth embodiment.

Examples of the spacer 507 include chromium balls and stainless steel balls having magnetism, which are metal balls having a glossy surface. Accordingly, the reflected light on the surface of the spacer 507 may turn into stray light, which may affect the optical property of the lens tube.

Such stray light may be prevented, for example, by the method in which the spherical outer circumference of the spacers are subjected to surface treatment such as blackening and delustering by plating and other techniques in order to prevent reflection of light from the ball surface. However, the method brings about problems such as increase in cost and cycle time due to the surface treatment and generation of varied outline dimensions of the spacers after application of the surface treatment.

However, in the case of the method of assembling the lens tube with use of the light-shielding resin 512 shown in the eighth embodiment, it becomes possible to prevent stray light without applying the surface treatment to the spacers 507, so that improvement in cost and cycle time of the surface treatment can be achieved.

Moreover, the spacers 507 can reliably be fixed to the first and second lenses 501, 502 by applying the light-shielding resin 512 to the contact section between the first lens 501 and each of the spacers 507 and to the contact section between the second lens 502 and each of the spacers 507.

Figure 24:
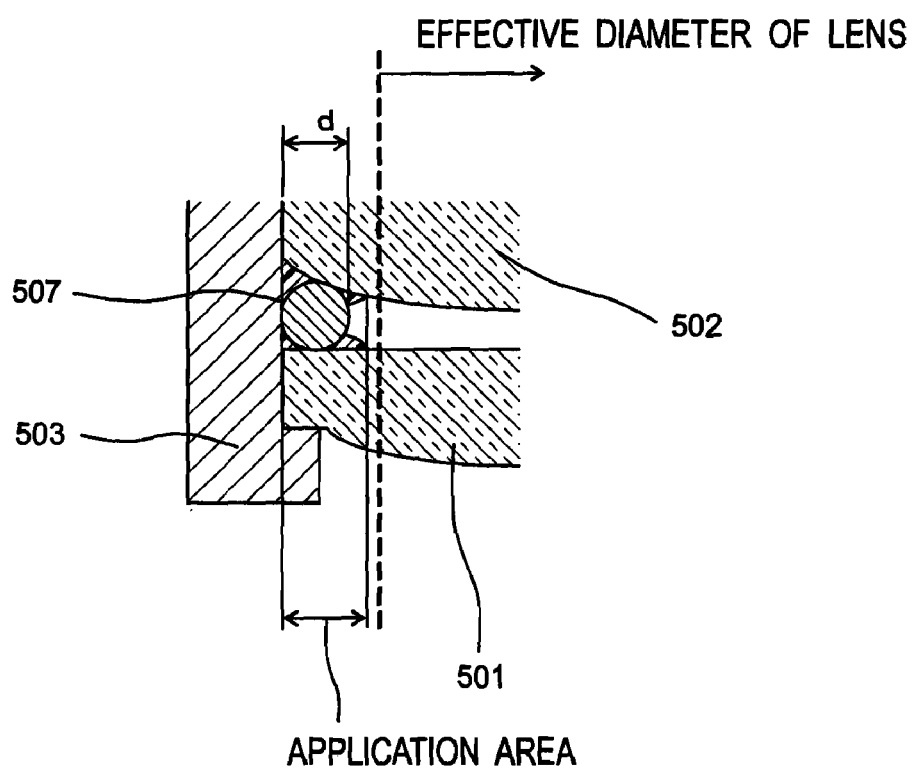
FIG. 24 is an explanatory view for explaining an application area of light-shielding resin.

In this case, the application area of the light-shielding resin 512 should be equal to or larger than the outline (diameter d) of each spacer 507, i.e., as large as that the outer circumference of the spacer 507 is covered with the light-shielding resin 512 and the spacer 507 is not visible from the end of the lens tube, and the application area of the light-shielding resin 512 should also be outside the effective diameter of the first and second lens 501, 502 as shown in FIG. 24. This makes it possible to prevent stray light due to the spacer 507 without affecting the optical property of the lens tube.

Although ball-like (or spherical) spacers are used in the first to eighth embodiments, the shape of the spacers is naturally not limited thereto.

Figure 25:
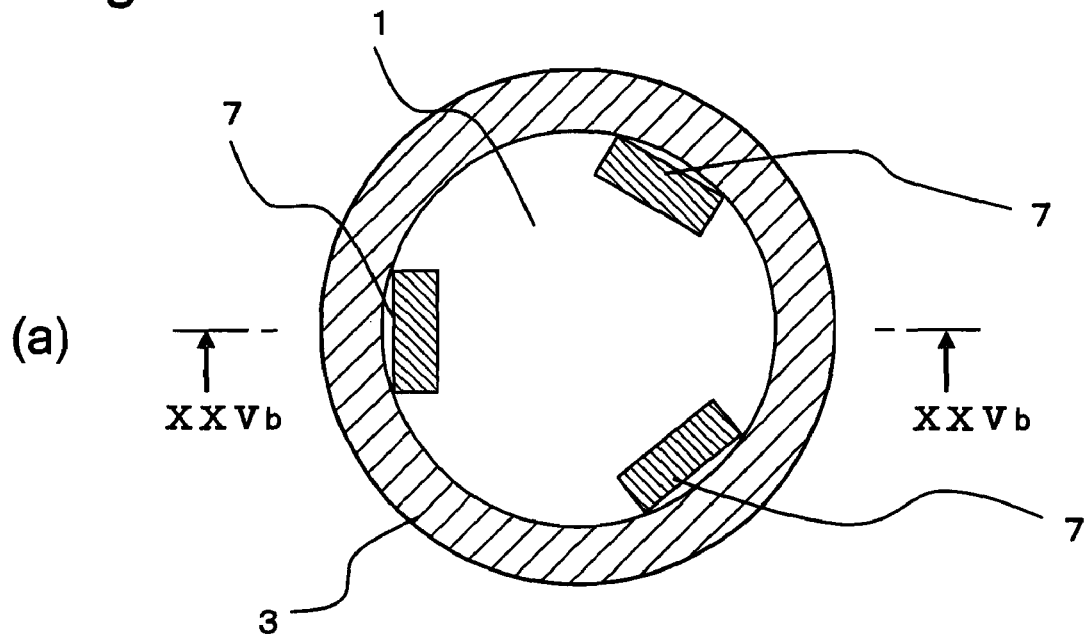
Figure 25:
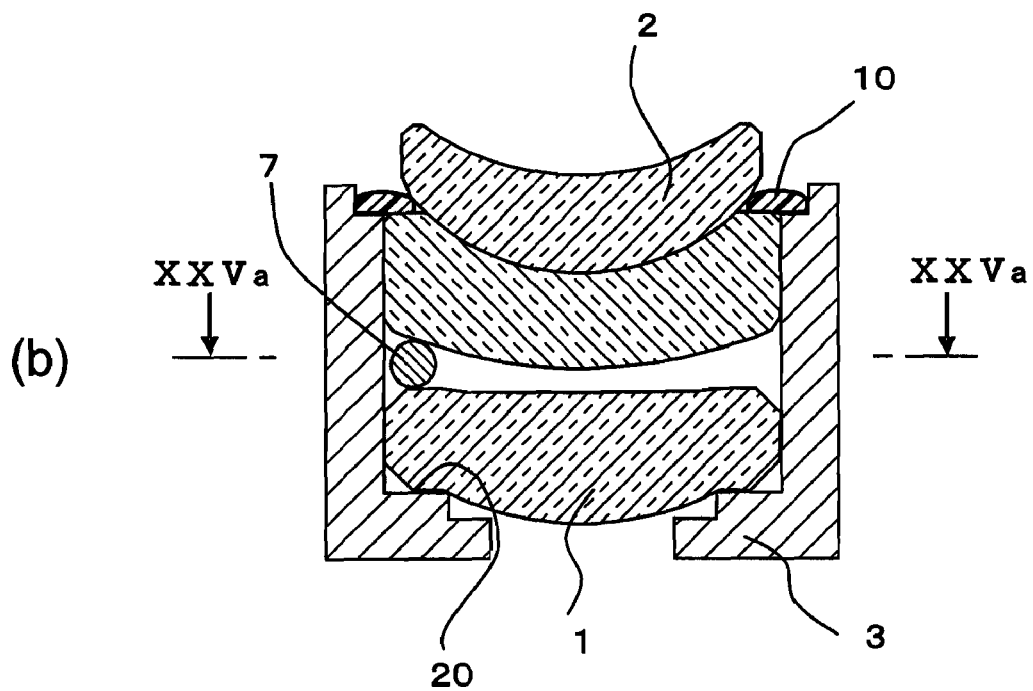

When cylindrical spacers are used as shown in FIG. 25 for example, the points of contact of the first and second lenses 1, 2 and the spacers 7 are placed with high precision on the same circumference around the optical axes of the first and second lenses 1, 2, and therefore it becomes possible to align the optical axes of the lenses with high precision as in the case of using the spherical spacers.

Therefore, the spacer 7 may take any shape as long as the points of contact of the first and second lenses 1, 2 and the spacers 7 are placed on the same circumference around the optical axes of the first and second lenses 1, 2 with high precision.

Although description has been given of the case where the opposite surfaces of the first and second lenses are a combination of a convex face and a flat face in the first to eighth embodiments, the combination of the opposite surfaces are not limited thereto. The invention may be applied for securing a distance between lenses of various combinations including a combination of convex and convex surfaces, a combination of convex and concave surfaces, a combination of flat surfaces, a combination of flat and concave surfaces, and a combination of concave surfaces.

Although description has been given of the method of assembling the lens tube with use of the spherical spacers made of magnetic materials such as chromium balls and stainless steel balls in the first to eighth embodiments, the spacers are not limited thereto and any spacer including magnetic materials which is attracted to the spacer positioning magnet may be used.

Although the spacer positioning magnet 508 was made of permanent magnet in the sixth to eighth embodiments, the material of the spacer positioning magnet is not limited thereto, and any material such as electromagnet may be used as long as the spacer positioning magnets having magnetic poles of the same number as the spacers are placed outside the lens frame at equal intervals in the circumferential direction.

Although the spacers 7, 27, 507 were fixed to the first lenses 1, 501 with the adhesives 10, 510 and the light-shielding resins 12, 512 in the first to eighth embodiments, the fixing method of the spacers are not limited thereto.

Although the lens frames 3, 503 were in cylindrical shape in the first to eighth embodiments, the shape of the lens frame is not limited thereto and the lens frame may be in any tubular shape as long as it can hold lenses.

Moreover, the lens tube may include:

a plurality of lenses;

a tubular lens frame for holding a plurality of the lenses with their optical axes aligned with each other; and three or more spherical spacers which are placed in between at least two lenses out of a plurality of the lenses and which come into contact with the opposite lens surfaces of the two lenses and with the inner wall of the lens surface, wherein the spherical spacer includes a magnetic material.

The above-configured lens tube has three or more spherical spacers including magnetic materials in between at least two lenses, the first and second lenses out of a plurality of the lenses. Consequently, placing spacer positioning magnets outside the lens frame during assembling process makes it possible to regulate the motion of the spherical spacers in the circumferential direction and in the diameter direction. More specifically, spheres including magnetic materials are used as the spacers for holding the lenses at a predetermined distance within the lens frame, and the spheres including magnetic materials are attracted to predetermined positions with the magnetic force of the spacer positioning magnets placed outside the lens frame, so that it becomes possible to easily place the spheres in between the lenses while keeping the spheres unmoved during assembling process. Therefore, it becomes possible to keep a distance between lenses with high precision while reliably preventing inclination of the lenses within the lens frame during assembling process.

In the lens tube, the lens frame may be made of paramagnetic materials or diamagnetic materials.

According to the lens tube, the lens frame is made of paramagnetic materials or diamagnetic materials which can negate the influence of magnetization by the magnetism generator, so that it becomes possible to easily place the spacers at predetermined positions without the spherical spacers attracted to the lens frame.

Moreover, in an assembling method of a lens tube, the lens tube including a plurality of lenses; a tubular lens frame for holding a plurality of the lenses with their optical axes aligned with each other; and three or more spherical spacers including magnetic materials which are placed in between at least two lenses out of a plurality of the lenses and which come into contact with the opposite lens surfaces of the two lenses and with the inner wall of the lens surface, the assembling method of the lens tube may include:

a first step for inserting a first lens, that is one of the two lenses, into the tubular lens frame;

a second step for placing the three or more spherical spacers on the first lens inserted into the lens frame;

a third step for placing a spacer positioning magnet outside the lens frame and using attraction between a magnetic pole of the spacer positioning magnet and the spherical spacer placed in the lens frame to position the spherical spacer; and a fourth step for inserting a second lens, that is the other lens of the two lenses, into the lens frame in a state that the spherical spacers are positioned by the spacer positioning magnet, and fixing the second lens to the lens frame.

According to the above-constituted assembling method of the lens tube, in the lens tube having three or more spherical spacers including magnetic materials in between at least two lenses, the first and second lenses out of a plurality of the lenses, the spacer positioning magnet is placed outside the lens frame, so that the motion of the spherical spacers including magnetic materials is regulated in the circumferential direction and in the diameter direction. More specifically, spheres including magnetic materials are used as the spacers for holding the first and second lenses at a predetermined distance within the lens frame, and the spheres including the magnetic materials are attracted to the predetermined positions with the magnetic force of the spacer positioning magnet placed outside the lens frame so as to regulate the motion of the spheres, by which the sphere may easily be placed in between the lenses while being kept unmoved during assembling process. Therefore, it becomes possible to keep a distance between lenses with high precision while reliably preventing inclination of the lenses within the lens frame.

In the method of assembling the lens tube, the number of the magnetic poles of the spacer positioning magnets may be identical to the number of the spherical spacers placed on the first lens, and in the third step, the magnetic poles of the spacer positioning magnets may be placed outside the lens frame at equal intervals in the circumferential direction.

According to the method of assembling the lens tube, the spacer positioning magnets having magnetic poles of the same number as the spherical spacers placed on the first lens are placed outside the lens frame at equal intervals in the circumferential direction, so that the spherical spacers may be placed within the lens frame at equal intervals in the circumferential direction.

In the method of assembling the lens tube, a spacer guide for placing the spherical spacers at prescribed positions may be used.

According to the method of assembling the lens tube, using the spacer guide makes it possible to easily place the spherical spacers at predetermined positions.

In the method of assembling the lens tube, the lens frame may be made of paramagnetic materials or diamagnetic materials.

According to the method of assembling the lens tube, the lens frame is made of paramagnetic materials or diamagnetic materials which can negate the influence of magnetization by the magnetism generator, so that it becomes possible to easily place the spherical spacers at predetermined positions without the spherical spacers attracted to the lens frame.

In the method of assembling the lens tube, the spherical spacers may be placed outside the effective diameter of the first and second lenses in the second step.

According to the method of assembling the lens tube, placing the spherical spacers outside the effective diameter of the first and second lenses makes it possible to conduct high-precision assembling without affecting the optical property of the lens tube.

The method of assembling the lens tube may have a fifth step for fixing the spherical spacers to at least one of the first and second lenses with adhesives.

According to the method of assembling the lens tube, the spherical spacers are fixed to at least one of the first and second lens with adhesives, so that it becomes possible to fix the spherical spacers more firmly to predetermined positions as compared with the case where the spherical spacers are only held in between the lens surfaces.

In the method of assembling the lens tube, the application area of the adhesives for fixing the spherical spacers may be outside the effective diameter of the first and second lenses.

According to the method of assembling the lens tube, the application area of the adhesives is made outside the effective diameter of the lenses, so that it becomes possible to fix the spherical spacers without affecting the optical property of the lens tube.

In the method of assembling the lens tube, the adhesives for fixing the first and second lenses and the spherical spacers may be light-shielding resin.

According to the method of assembling the lens tube, using the light-shielding resin for fixing the spherical spacers makes it possible to achieve both the fixation of the spherical spacers and the prevention of stray light caused by reflection from the spacer surfaces.

In the method of assembling the lens tube, the light-shielding resin may be applied to the contact section between the first lens and each of the spherical spacers and to the contact section between the second lens and each of the spacers in the fourth step.

According to the method of assembling the lens tube, the spherical spacers are reliably fixed by applying the light-shielding resin to the contact section between the first lens and each of the spacers and to the contact section between the second lens and each of the spacers.

In the method of assembling the lens tube, the application area of the light-shielding resin may be equal to or larger than the outline of each of the spacers, and the light-shielding resin may be applied to the outside of the effective diameter of the lenses.

According to the method of assembling the lens tube, the application area of the light-shielding resin is equal to or larger than the diameter of each spacer and is outside the effective diameter of the lenses, so that stray light due to fixation of the spherical spacers and reflection thereof may be prevented without the optical property of the lens tube being affected.

The invention claimed is:

1. A lens tube, comprising:
   two lenses;
   a tubular lens frame for holding the two lenses; and
   three or more spacers which are placed between the two lenses and which are in contact with opposite lens surfaces of the two lenses, wherein
   portions of the lens frame which respectively hold the two lenses have an identical inner diameter,
   the spacers are in contact with an inner wall of the lens frame,
   the spacers are fixed to at least one of the two lenses with adhesive, and
   the adhesive is applied to an outside of an area of an effective beam which passes a lens system composed of the two lenses.

2. The lens tube according to claim 1, wherein the adhesive comprises a light-shielding resin.

3. A lens tube comprising:
   two lenses;
   a tubular lens frame for holding the two lenses; and
   three or more spacers which are placed between the two lenses and which are in contact with opposite lens surfaces of the two lenses, wherein
   constituent materials of the spacers include ferromagnetic materials or ferrimagnetic materials.

4. The lens tube according to claim 3, wherein a constituent material of the lens frame is a paramagnetic material or a diamagnetic material.

5. The lens tube according to claim 3, wherein the spacers are placed outside an area of an effective beam which passes a lens system composed of the two lenses.

6. The lens tube according to claim 3, wherein the spacers are fixed to at least one of the two lenses with adhesive, and the adhesive is applied to an outside of an area of an effective beam which passes a lens system composed of the two lenses.

7. The lens tube according to claim 6, wherein the adhesive comprises a light-shielding resin.

8. A method of assembling a lens tube, the lens tube comprising two lenses; a tubular lens frame for holding the two lenses; and spacers which are placed between the two lenses and which are in contact with opposite lens surfaces of the two lenses, wherein constituent materials of the spacers include ferromagnetic materials or ferrimagnetic materials, and a constituent material of the lens frame is a paramagnetic material or a diamagnetic material, the method of assembling the lens tube comprising:
   a first step for inserting a first lens, that is one of the two lenses, into the tubular lens frame;
   a second step for placing the three or more spacers on the first lens inserted into the lens frame;
   a third step for placing a magnetism generator outside the lens frame and using attraction between a magnetic pole of the magnetism generator and each spacer placed in the lens frame to thereby position the spacers; and
   a fourth step for inserting a second lens, that is the other lens of the two lenses, into the lens frame in a state that the spacers are positioned by the magnetism generator, and fixing the second lens to the lens frame.

9. The method of assembling the lens tube according to claim 8, wherein
   a lens surface on which the spacers are placed is an inclined plane which is gradually lowered toward an inside of the lens frame, and wherein
   wall thickness t of the lens frame is expressed as $$t < \sqrt{\frac{M_1 M_2}{4\pi\mu mg \times \cos\theta}}$$

wherein $\theta$ represents an angle of inclination of the lens surface which is in contact with the spacer, $M_1$ represents magnetic pole strength of the spacer, m represents mass of the spacer, $M_2$ represents magnetic pole strength of the magnetism generator, $\mu$ represents magnetic permeability of the lens frame, and g represents acceleration of gravity.

10. The method of assembling the lens tube according to claim 9,
   wherein number of the magnetic poles of the magnetism generators is identical to number of the spacers placed on the first lens, and wherein in the third step, magnetic poles of the magnetism generators are placed outside the lens frame at equal intervals in a circumferential direction of the lens frame.

11. The method of assembling the lens tube according to claim 9, wherein a spacer guide for placing the spacers at prescribed positions is used.

12. The method of assembling the lens tube according to claim 9, wherein in the second step, the spacers are placed outside an area of an effective beam which passes the first and second lenses.

13. The method of assembling the lens tube according to claim 9, comprising
   a fifth step for fixing the spacers to at least one of the first and second lenses with adhesive, wherein
   an application area of the adhesive is outside an area of an effective beam which passes the first and second lenses.

14. The method of assembling the lens tube according to claim 13, wherein the adhesive comprises a light-shielding resin.

15. The method of assembling the lens tube according to claim 14, wherein the light-shielding resin is applied to contact sections between the first lens and each of the spacers and to contact sections between the second lens and each of the spacers.

16. A camera module comprising:
   a lens tube comprising:
      two lenses;
      a tubular lens frame for holding the two lenses; and
      three or more spacers which are placed between the two lenses and which are in contact with opposite lens surfaces of the two lenses, wherein
      portions of the lens frame which respectively hold the two lenses have an identical inner diameter,
      the spacers are in contact with an inner wall of the lens frame,
      the spacers are fixed to at least one of the two lenses with adhesive, and
      the adhesive is applied to an outside of an area of an effective beam which passes
   a lens system composed of the two lenses; and
   a light receiving section having an image sensor for picking up images formed with use of the lens tube.

* * * * *